US010659967B2

(12) United States Patent
Wei et al.

(10) Patent No.: US 10,659,967 B2
(45) Date of Patent: May 19, 2020

(54) CHANNEL USAGE BEACON SIGNAL TRANSMISSIONS BASED ON UPLINK TRANSMISSIONS OVER AN UNLICENSED RADIO FREQUENCY SPECTRUM BAND

(71) Applicant: QUALCOMM Incorporated, San Diego, CA (US)

(72) Inventors: Yongbin Wei, La Jolla, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 14/685,327

(22) Filed: Apr. 13, 2015

(65) Prior Publication Data

US 2015/0358826 A1    Dec. 10, 2015

Related U.S. Application Data

(60) Provisional application No. 62/010,366, filed on Jun. 10, 2014.

(51) Int. Cl.
*H04W 16/14* (2009.01)
*H04L 5/00* (2006.01)
*H04L 27/00* (2006.01)
*H04W 74/08* (2009.01)
*H04W 72/04* (2009.01)
(Continued)

(52) U.S. Cl.
CPC .......... *H04W 16/14* (2013.01); *H04L 5/0032* (2013.01); *H04L 5/0048* (2013.01); *H04L 5/0053* (2013.01); *H04L 27/0006* (2013.01); *H04W 72/0413* (2013.01); *H04W 72/1268* (2013.01); *H04W 74/0816* (2013.01);
(Continued)

(58) Field of Classification Search
CPC ................................... H04W 72/0413
See application file for complete search history.

(56) References Cited

U.S. PATENT DOCUMENTS

2009/0092091 A1 * 4/2009 Balasubramanian ....................... H04L 5/0064 370/329
2010/0312894 A1 * 12/2010 Awad .................... H04L 5/0007 709/226

(Continued)

FOREIGN PATENT DOCUMENTS

| CN | 102754508 A | 10/2012 |
|---|---|---|
| WO | WO-2013087835 A1 | 6/2013 |
| WO | WO-2013185835 A1 | 12/2013 |

OTHER PUBLICATIONS

ISA/EPO, International Search Report and Written Opinion of the International Searching Authority, Int'l App. No. PCT/US2015/025732, dated Jul. 1, 2015, European Patent Office, Rijswijk, NL, 11 pgs.

*Primary Examiner* — Kevin M Cunningham
(74) *Attorney, Agent, or Firm* — Liem T. Do

(57) ABSTRACT

Techniques and described for wireless communication. One method includes generating a channel usage beacon signal (CUBS) at a wireless device, wherein a waveform of the CUBS is based at least in part on a scheduled uplink transmission by the wireless device; and transmitting, by the wireless device, the CUBS over an unlicensed radio frequency spectrum band to occupy the unlicensed radio frequency spectrum band prior to the scheduled uplink transmission.

27 Claims, 17 Drawing Sheets

(51) Int. Cl.
*H04W 72/12* (2009.01)
*H04L 27/26* (2006.01)

(52) U.S. Cl.
CPC ............ *H04L 5/001* (2013.01); *H04L 5/0023* (2013.01); *H04L 27/2602* (2013.01)

(56) References Cited

U.S. PATENT DOCUMENTS

| | | | |
|---|---|---|---|
| 2012/0140717 A1* | 6/2012 | Zhu | H04L 5/001 370/329 |
| 2012/0170563 A1 | 7/2012 | Abraham et al. | |
| 2013/0039305 A1* | 2/2013 | Kishiyama | H04W 72/1263 370/329 |
| 2013/0051345 A1* | 2/2013 | Ciochina | H04L 5/0041 370/329 |
| 2013/0315152 A1 | 11/2013 | Ratasuk et al. | |
| 2014/0003387 A1* | 1/2014 | Lee | H04L 5/001 370/330 |
| 2014/0036853 A1 | 2/2014 | Kim et al. | |
| 2014/0112289 A1 | 4/2014 | Kim et al. | |
| 2014/0219152 A1* | 8/2014 | Anto | H04W 52/08 370/311 |
| 2014/0287769 A1* | 9/2014 | Taori | H04W 74/0808 455/450 |
| 2014/0335876 A1 | 11/2014 | Ratasuk et al. | |
| 2015/0146631 A1* | 5/2015 | Kim | H04W 74/0833 370/329 |
| 2015/0223241 A1 | 8/2015 | Cattoni et al. | |
| 2017/0118748 A1* | 4/2017 | Kalhan | H04W 76/14 |

* cited by examiner

CHANNEL USAGE BEACON SIGNAL TRANSMISSIONS BASED ON UPLINK TRANSMISSIONS OVER AN UNLICENSED RADIO FREQUENCY SPECTRUM BAND

CROSS REFERENCES

The present Application for Patent claims priority to U.S. Provisional Patent Application No. 62/010,366 by Wei et al., entitled "Channel Usage Beacon Signal Transmissions Based on Uplink Transmissions Over an Unlicensed Radio Frequency Spectrum," filed Jun. 10, 2014, assigned to the assignee hereof, and expressly incorporated by reference herein.

FIELD OF DISCLOSURE

The following relates generally to wireless communication, and more specifically to channel usage beacon signal (CUBS) transmissions based on uplink transmissions over an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple wireless devices (e.g., mobile phones and/or tablet computers). A base station may communicate with wireless devices on downlink channels (e.g., for transmissions from the base station to the wireless devices) and uplink channels (e.g., for transmissions from the wireless devices to the base station).

Some modes of communication may enable communications with a wireless device over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. Prior to gaining access to, and communicating over, the unlicensed radio frequency spectrum band, a transmitting apparatus may, in some examples, perform a listen before talk (LBT) procedure to contend for access to the unlicensed radio frequency spectrum band. An LBT procedure may include performing a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel again at a later time. When it is determined that the channel of the unlicensed radio frequency spectrum band is available, or clear, a channel usage beacon signal (CUBS) or preamble may be transmitted over the channel, to reserve the channel until a down link transmission and/or uplink transmission may be made over the channel.

SUMMARY

The present disclosure generally relates to one or more improved techniques for generating and transmitting a CUBS prior to an uplink transmission in an unlicensed radio frequency spectrum band. More particularly, the techniques generate a CUBS based on a scheduled uplink transmission by, for example, matching a bandwidth of the CUBS to a bandwidth of the scheduled uplink transmission; matching a transmit power of the CUBS to a transmit power of the scheduled uplink transmission; and/or duplicating a portion of the scheduled uplink transmission in the CUBS.

In a first set of illustrative examples, a method for wireless communication is described. In one example, the method may include generating a channel usage beacon signal (CUBS) at a wireless device, wherein a waveform of the CUBS is based at least in part on a scheduled uplink transmission by the wireless device; and transmitting, by the wireless device, the CUBS over an unlicensed radio frequency spectrum band to occupy the unlicensed radio frequency spectrum band prior to the scheduled uplink transmission.

In some examples of the method, generating the CUBS may include matching a transmit power of the CUBS to a transmit power of the scheduled uplink transmission. In some examples of the method, generating the CUBS may include matching a bandwidth of the CUBS to a bandwidth of the scheduled uplink transmission.

In some examples of the method, matching the bandwidth of the CUBS to the bandwidth of the scheduled uplink transmission may in some examples include matching a bandwidth of the CUBS to a frequency tone set allocated to the scheduled uplink transmission. In some examples, the method may include duplicating at least a portion of the scheduled uplink transmission in the CUBS. In some examples, the method may include receiving an indication of the frequency tone set allocated to the scheduled uplink transmission from a base station. In some examples, the method may include determining the frequency tone set allocated to the scheduled uplink transmission based at least in part on a static or semi-static schedule associated with the scheduled uplink transmission.

In some examples of the method, matching the bandwidth of the CUBS to the bandwidth of the scheduled uplink transmission may include matching a number of resource block interlaces associated with the CUBS to a number of resource block interlaces associated with the scheduled uplink transmission. In some examples of the method, matching the bandwidth of the CUBS to the bandwidth of the scheduled uplink transmission may include matching a total number of resource blocks used to transmit the CUBS to a total number of resource blocks associated with the scheduled uplink transmission.

In some examples of the method, the scheduled uplink transmission may include a transmission selected from a group consisting of: a physical uplink shared channel (PUSCH) transmission, a physical uplink control channel (PUCCH) transmission, and a sounding reference signal (SRS) transmission.

In some examples of the method, the scheduled uplink transmission may include both an SRS transmission and at least one of a PUSCH transmission or a PUCCH transmission. In these examples, the method may include matching a bandwidth of the CUBS to a frequency tone set allocated to the at least one of the PUSCH transmission or the PUCCH transmission, and transmitting the SRS transmission as a last symbol of the scheduled uplink transmission. In some of these examples, the method may further include matching a total transmit power of the SRS transmission to a total transmit power of the at least one of the PUSCH transmission or the PUCCH transmission, and/or matching a power spectral density of the SRS transmission to a power spectral density of the at least one of the PUSCH transmission or the PUCCH transmission.

In some examples of the method, the scheduled uplink transmission may include a multiplexed transmission including the SRS transmission multiplexed with at least one of the PUSCH transmission or the PUCCH transmission. In these examples, the CUBS may be transmitted over a frequency tone set allocated to the multiplexed transmission.

In some examples of the method, the waveform of the CUBS may be further generated based at least in part on an identity of the wireless device. In some examples of the method, the waveform of the CUBS may be further generated based at least in part on an identity of a transmission period in which the scheduled uplink transmission is initially scheduled. In some examples of the method, the scheduled uplink transmission may be scheduled during a transmission period selected from a group consisting of a Listen Before Talk (LBT) frame, a base station synchronization frame, or a subframe.

In some examples of the method, the wireless device may include a first wireless device, and the scheduled uplink transmission may include a first scheduled uplink transmission of a plurality of scheduled uplink transmissions to a base station during a transmission period. The plurality of scheduled uplink transmissions may also include a second scheduled uplink transmission by a second wireless device. The first scheduled uplink transmission may differ from the second scheduled uplink transmission.

In some examples of the method, the scheduled uplink transmission may include a first scheduled uplink transmission, and the CUBS may include a first CUBS. In these examples, the method may further include generating a second CUBS at the wireless device, wherein a waveform of the second CUBS may be based at least in part on a second scheduled uplink transmission by the wireless device; and transmitting, by the wireless device, the second CUBS over the unlicensed radio frequency spectrum band to occupy the unlicensed radio frequency spectrum band prior to the second scheduled uplink transmission.

In a second set of illustrative examples, an apparatus for wireless communication is described. In one configuration, the apparatus may include means for generating a CUBS at a wireless device, wherein a waveform of the CUBS is based at least in part on a scheduled uplink transmission by the wireless device; and means for transmitting, by the wireless device, the CUBS over an unlicensed radio frequency spectrum band to occupy the unlicensed radio frequency spectrum band prior to the scheduled uplink transmission. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to generate a CUBS at a wireless device, wherein a waveform of the CUBS is based at least in part on a scheduled uplink transmission by the wireless device; and transmit, by the wireless device, the CUBS over an unlicensed radio frequency spectrum band to occupy the unlicensed radio frequency spectrum band prior to the scheduled uplink transmission. In some examples, the instructions may also be executable by the processor to implement one or more aspects of the method for wireless communication described above with respect to the first set of illustrative examples.

In a fourth set of illustrative examples, a non-transitory computer-readable medium storing code for wireless communication is described. The code may include instructions executable by a processor to generate a CUBS at a wireless device, wherein a waveform of the CUBS is based at least in part on a scheduled uplink transmission by the wireless device; and transmit, by the wireless device, the CUBS over an unlicensed radio frequency spectrum band to occupy the unlicensed radio frequency spectrum band prior to the scheduled uplink transmission. In some examples, the instructions may also be executable by the processor to cause the wireless communication apparatus to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
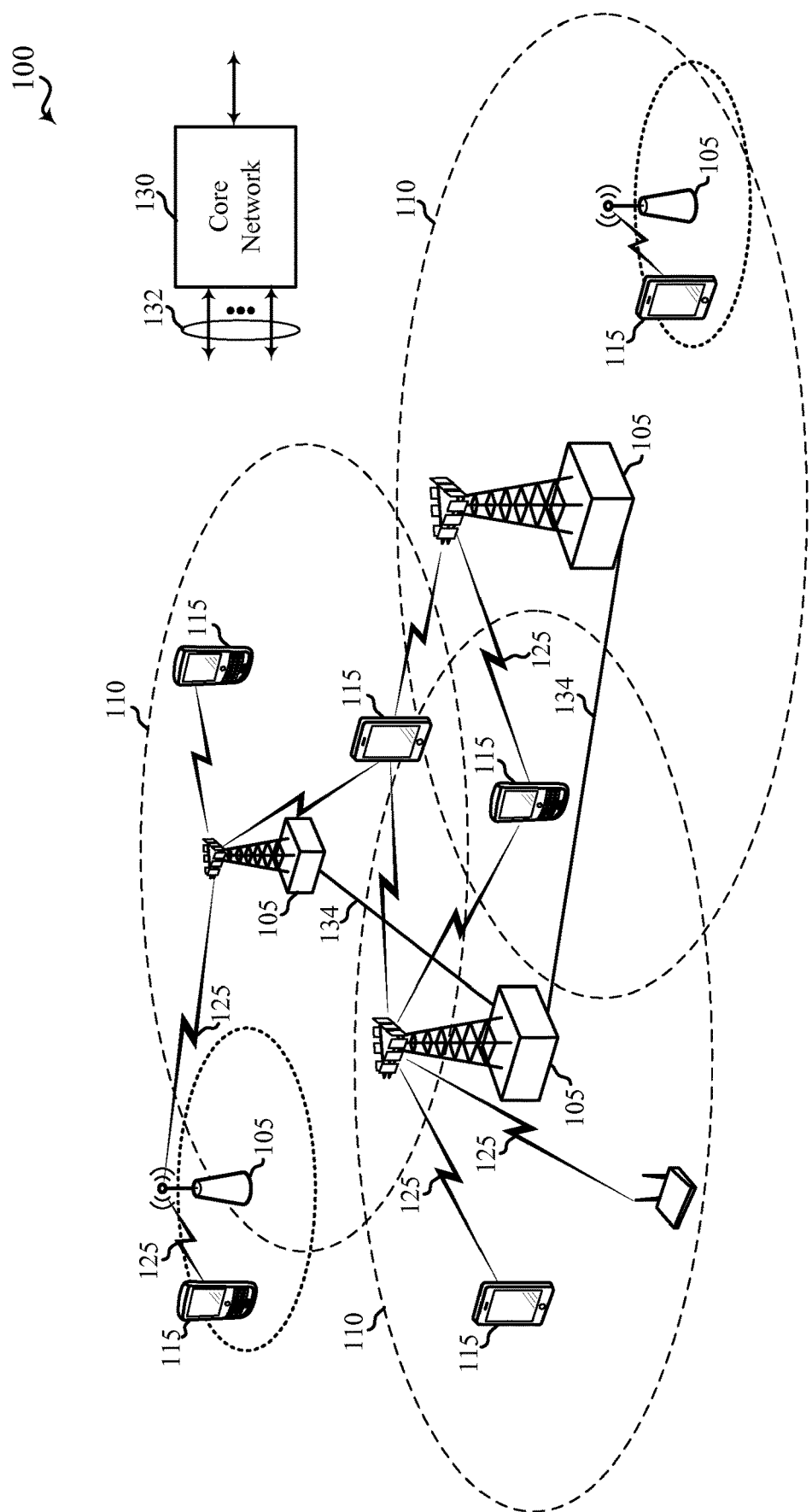
FIG. 1 shows a block diagram of a wireless communication system, in accordance with various aspects of the present disclosure.

Techniques are described in which CUBS transmissions are based on uplink transmissions over an unlicensed radio frequency spectrum band. As used in this description, a CUBS may be any signal that functions, in at least some respects, as a preamble preceding a data transmission. In some examples, the unlicensed radio frequency spectrum band may be used for cellular communications (e.g., Long Term Evolution (LTE) communications and/or LTE-Advanced (LTE-A) communications). In some examples, the unlicensed radio frequency spectrum band may be a radio frequency spectrum band for which apparatuses may need to contend for access because the radio frequency spectrum band is available, at least in part, for unlicensed use such as Wi-Fi use).

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. Prior to gaining access to, and communicating over, the unlicensed radio frequency spectrum band, a transmitting apparatus may, in some examples, perform an LBT procedure to gain access to the unlicensed radio frequency spectrum band. Such an LBT procedure may include performing a CCA (including, in some examples, an extended CCA) to determine whether a channel of the unlicensed radio frequency spectrum band is available. When it is determined that a channel is not available, a CCA may be performed for the channel again at a later time. When it is determined that the channel of the unlicensed radio frequency spectrum band is available, or clear, a CUBS may be transmitted over the channel, to reserve the channel until a down link transmission and/or uplink transmission may be made over the channel.

The disclosed techniques generate a CUBS based on a scheduled uplink transmission by, for example, matching a bandwidth of the CUBS to a bandwidth of the scheduled uplink transmission; matching a transmit power of the CUBS to a transmit power of the scheduled uplink transmission; and/or duplicating a portion of the scheduled uplink transmission in the CUBS.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of wireless devices 115 (e.g., user equipments (UEs)), and a core network 130. Some of the base stations 105 may communicate with the wireless devices 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the wireless devices 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a wireless local area network (WLAN) access point, a WiFi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The wireless devices 115 may be dispersed throughout the wireless communication system 100. A wireless device 115 may also be referred to by those skilled in the art as a UE, a mobile device, a mobile station, a subscriber station, a mobile unit, a subscriber unit, a wireless unit, a remote unit, a wireless communication device, a remote device, a mobile subscriber station, an access terminal, a mobile terminal, a wireless terminal, a remote terminal, a handset, a user agent, a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A wireless device 115 may be able to communicate with macro eNBs, pico eNBs, femto eNBs, relays, and the like. A wireless device 115 may also be able to communicate over different types of access networks, such as cellular or other WWAN access networks, or WLAN access networks. In some modes of communication with a wireless device 115, communication may be conducted over a plurality of communication links 125 or channels (i.e., component carriers), with each channel using a component carrier between the wireless device 115 and one of a number of cells (e.g., serving cells, which cells may in some cases be operated by the same or different base stations 105).

Each component carrier may be provided over the licensed radio frequency spectrum band or the unlicensed radio frequency spectrum band, and a set of component carriers used in a particular mode of communication may all be received (e.g., at a wireless device 115) over the licensed radio frequency spectrum band, all be received (e.g., at a wireless device 115) over the unlicensed radio frequency spectrum band, or be received (e.g., at a wireless device 115) over a combination of the licensed radio frequency spectrum band and the unlicensed radio frequency spectrum band.

The communication links 125 shown in wireless communication system 100 may include uplink channels (using component carriers) for carrying uplink (UL) communications (e.g., transmissions from a wireless device 115 to a base station 105) and/or downlink channels (using component carriers) for carrying downlink (DL) communications (e.g., transmissions from a base station 105 to a wireless device 115). The UL communications or transmissions may also be called reverse link communications or transmissions, while the DL communications or transmissions may also be called forward link communications or transmissions. The downlink communications and/or uplink communications may be made using the licensed radio frequency spectrum band, the unlicensed radio frequency spectrum band, or both.

In some examples of the wireless communication system 100, LTE/LTE-A may be deployed under different scenarios using the unlicensed radio frequency spectrum band. The deployment scenarios may include a supplemental downlink mode in which LTE/LTE-A downlink communications in the licensed radio frequency spectrum band may be offloaded to the unlicensed radio frequency spectrum band, a carrier aggregation mode in which both LTE/LTE-A downlink and uplink communications may be offloaded from the licensed radio frequency spectrum band to the unlicensed radio frequency spectrum band, and/or a standalone mode in which LTE/LTE-A downlink and uplink communications between a base station 105 and a wireless device 115 may take place in the unlicensed radio frequency spectrum band. Base stations 105 as well as wireless devices 115 may in some examples support one or more of these or similar modes of operation. OFDMA waveforms may be used in the communication links 125 for LTE/LTE-A downlink communications in the licensed radio frequency spectrum band and/or the unlicensed radio frequency spectrum band, while OFDMA, SC-FDMA and/or resource block interleaved FDMA waveforms may be used in the communication links 125 for LTE/LTE-A uplink communications in the licensed radio frequency spectrum band and/or the unlicensed radio frequency spectrum band.

Figure 2:
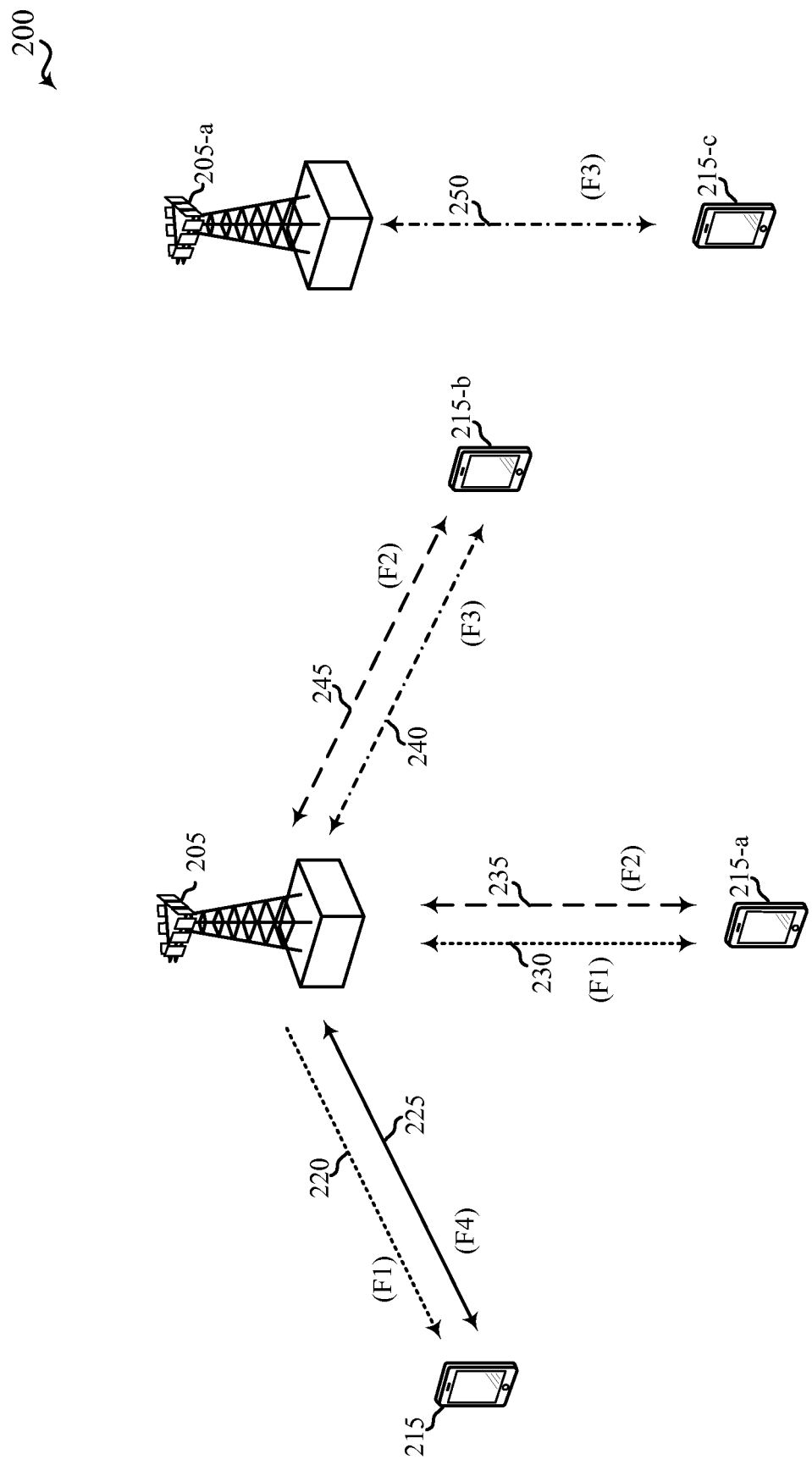
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first wireless device 215, a second wireless device 215-a, a third wireless device 215-b, and a fourth wireless device 215-c may be examples of aspects of one or more of the wireless devices 115 described with reference to FIG. 1.

In the example of a supplemental downlink mode in the wireless communication system 200, the first base station 205 may transmit OFDMA waveforms to the first wireless device 215 using a downlink channel 220. The downlink channel 220 may be associated with a frequency F1 in an unlicensed radio frequency spectrum band. The first base station 205 may transmit OFDMA waveforms to the first wireless device 215 using a first bidirectional link 225 and may receive SC-FDMA waveforms from the first wireless device 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one wireless device) or for multicast services (e.g., addressed to several wireless devices). This scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second wireless device 215-a using a second bidirectional link 230 and may receive OFDMA waveforms, SC-FDMA waveforms, and/or resource block interleaved FDMA waveforms from the second wireless device 215-a using the second bidirectional link 230. The second bidirectional link 230 may be associated with the frequency F1 in the unlicensed radio frequency spectrum band. The first base station 205 may also transmit OFDMA waveforms to the second wireless device 215-a using a third bidirectional link 235 and may receive SC-FDMA waveforms from the second wireless device 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third wireless device 215-b using a fourth bidirectional link 240 and may receive OFDMA waveforms, SC-FDMA waveforms, and/or resource block interleaved waveforms from the third wireless device 215-*b* using the fourth bidirectional link 240. The fourth bidirectional link 240 may be associated with a frequency F3 in the unlicensed radio frequency spectrum band. The first base station 205 may also transmit OFDMA waveforms to the third wireless device 215-*b* using a fifth bidirectional link 245 and may receive SC-FDMA waveforms from the third wireless device 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and unlicensed access radio frequency spectrum for capacity offload.

As described above, one type of service provider that may benefit from the capacity offload offered by using LTE/LTE-A in unlicensed access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using unlicensed access radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth wireless device 215-*c* using a bidirectional link 250 and may receive OFDMA waveforms, SC-FDMA waveforms, and/or resource block interleaved FDMA waveforms from the fourth wireless device 215-*c* using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-*a* described with reference to FIGS. 1 and/or 2, and/or one of the wireless devices 115, 215, 215-*a*, 215-*b*, and/or 215-*c* described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a clear channel assessment (CCA). The outcome of the CCA may indicate to the transmitting device whether a channel of an unlicensed radio frequency spectrum band is available or in use for the gating interval (also referred to as an LBT radio frame or a CCA frame). When a CCA indicates that the channel is available (e.g., "clear" for use) for a corresponding LBT radio frame, the transmitting apparatus may reserve and/or use the channel of the unlicensed radio frequency spectrum band during part or all of the LBT radio frame. When the CCA indicates that the channel is not available (e.g., that the channel is in use or reserved by another apparatus), the transmitting apparatus may be prevented from using the channel during the LBT radio frame.

In some cases, it may be useful for a transmitting apparatus to generate a gating interval on a periodic basis and synchronize at least one boundary of the gating interval with at least one boundary of a periodic interval. For example, it may be useful to generate a periodic gating interval for a cellular downlink in an unlicensed radio frequency spectrum band, and to synchronize at least one boundary of the periodic gating interval with at least one boundary of a periodic interval (e.g., a periodic LTE/LTE-A radio interval) associated with the cellular downlink. Examples of such synchronization are shown in FIG. 3.

Figure 3:
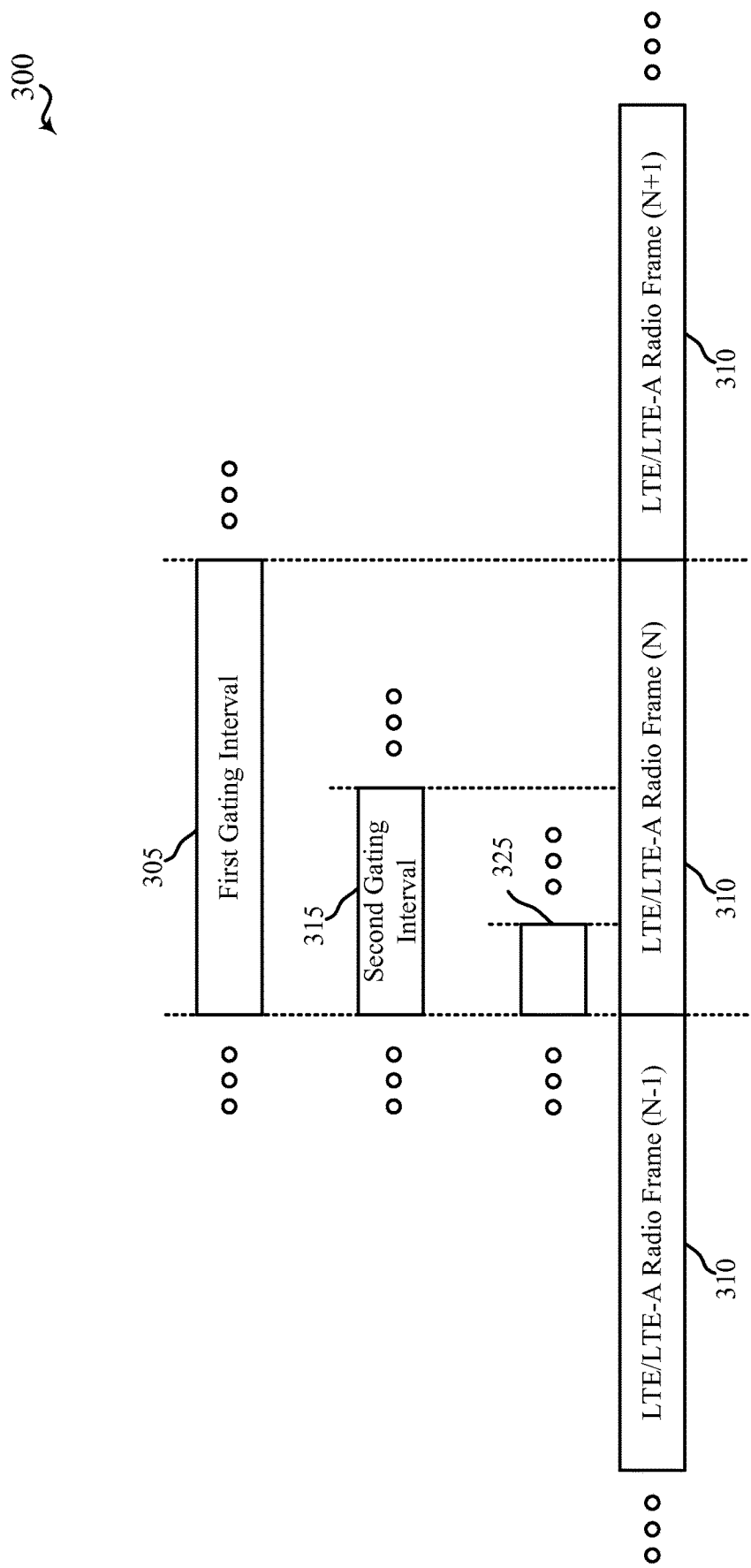
FIG. 3 shows examples of a gating interval (or LBT radio frame) for a cellular downlink in an unlicensed radio frequency spectrum band, in accordance with various aspects of the present disclosure.

FIG. 3 shows examples 300 of a gating interval (or LBT radio frame) for a cellular downlink in an unlicensed radio frequency spectrum band, in accordance with various aspects of the present disclosure. A first gating interval 305, a second gating interval 315, and/or a third gating interval 325 may be used as a periodic gating interval by an eNB or wireless device that supports transmissions over the unlicensed radio frequency spectrum band. Examples of such an eNB may include the base stations 105, 205, and/or 205-*a* described with reference to FIGS. 1 and/or 2, and examples of such a wireless device may include the wireless devices 115, 215, 215-*a*, 215-*b*, and/or 215-*c* described with reference to FIGS. 1 and/or 2. The first gating interval 305, the second gating interval 315, and/or the third gating interval 325 may in some examples be used with the wireless communication system 100 and/or 200 described with reference to FIGS. 1 and/or 2.

By way of example, the duration of the first gating interval 305 is shown to be equal to (or approximately equal to) a duration of an LTE/LTE-A radio frame 310 of a periodic interval associated with a cellular downlink. In some examples, "approximately equal" means the duration of the first gating interval 305 is within a cyclic prefix (CP) duration of the duration of the periodic interval.

At least one boundary of the first gating interval 305 may be synchronized with at least one boundary of the periodic interval that includes the LTE/LTE-A radio frames N−1 to N+1. In some cases, the first gating interval 305 may have boundaries that are aligned with the frame boundaries of the periodic interval. In other cases, the first gating interval 305 may have boundaries that are synchronized with, but offset from, the frame boundaries of the periodic interval. For example, the boundaries of the first gating interval 305 may be aligned with subframe boundaries of the periodic interval, or with subframe midpoint boundaries (e.g., the midpoints of particular subframes) of the periodic interval.

In some cases, the periodic interval may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic interval associated with the cellular downlink. In some examples, an "approximate sub-multiple of" means the duration of the second gating interval 315 and/or the third gating interval 325 is within a cyclic prefix (CP) duration of the duration of a sub-multiple of (e.g., half or one-fifth) the periodic interval. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of an unlicensed radio frequency spectrum band.

Figure 4:
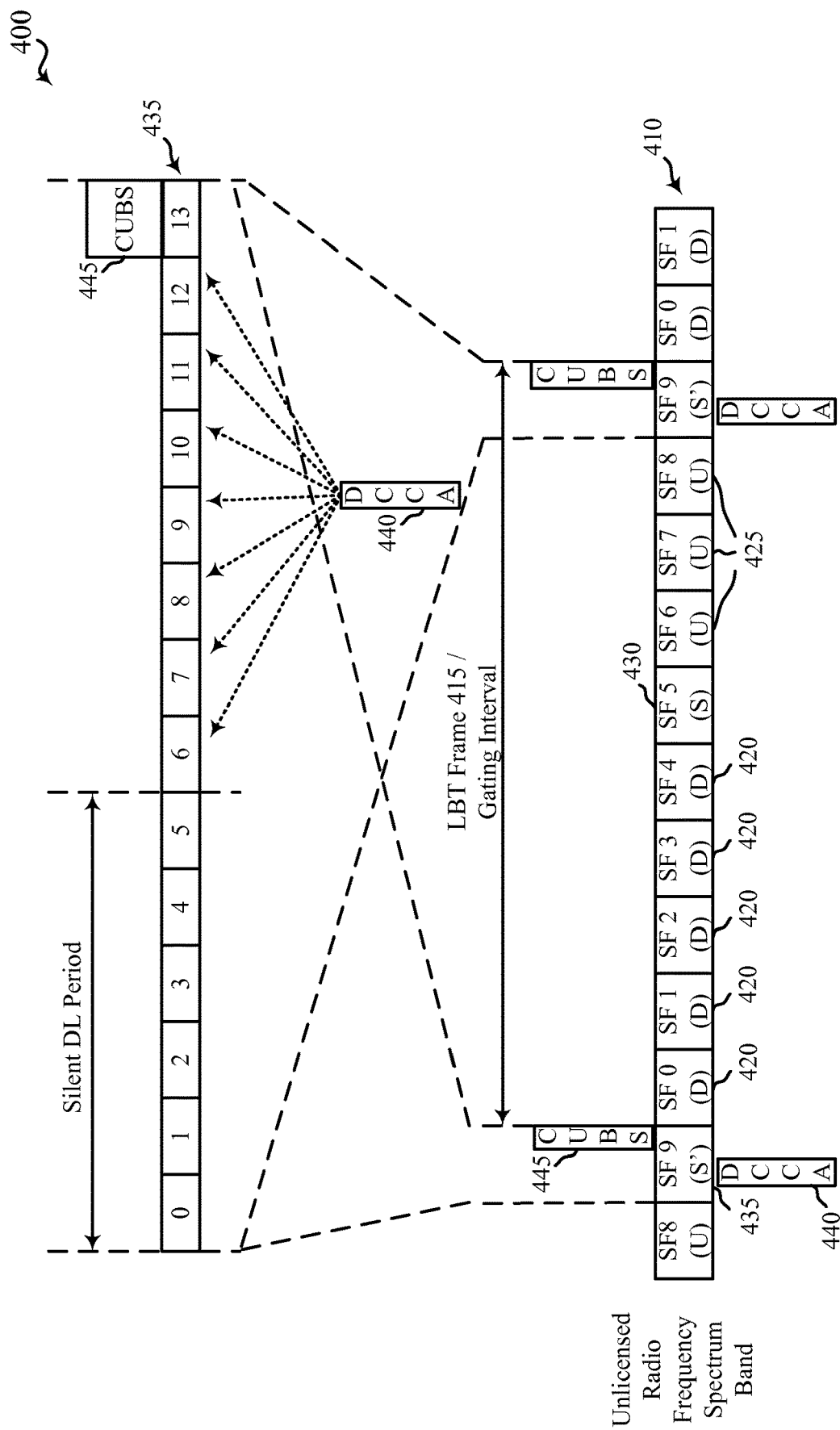
FIG. 4 shows an example of a wireless communication over an unlicensed radio frequency spectrum band, in accordance with various aspects of the present disclosure.

FIG. 4 shows an example 400 of a wireless communication 410 over an unlicensed radio frequency spectrum band, in accordance with various aspects of the present disclosure. An LBT radio frame 415, which may correspond to a gating interval such as the first gating interval 305 described with reference to FIG. 3, may have a duration of ten milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 535 may provide a transition between uplink subframes 425 and downlink subframes 420. During the S' subframe 435, a downlink clear channel assessment (DCCA) procedure 440 may be performed by one or more base stations, such as one or more of the base stations 105, 205, and/or 205-a described with reference to FIGS. 1 and/or 2, to reserve, for a period of time, the channel over which the wireless communication 410 occurs. Following a successful DCCA 440 by a base station, the base station may transmit a channel usage beacon signal (CUBS) 445 to provide an indication to other base stations and/or apparatuses (e.g., wireless devices, Wi-Fi access points, etc.) that the base station has reserved the channel. The CUBS 445 may not only reserve the channel for transmissions by the base station, but for uplink transmissions by its UEs. The CUBS 445 may also provide signals for automatic gain control (AGC) and tracking loop updates by wireless devices, before the base station transmits data to the wireless devices. In some examples, a CUBS 445 may be transmitted using a plurality of interleaved resource blocks. Transmitting a CUBS 445 in this manner may enable the CUBS 445 to occupy at least a certain percentage of the available frequency bandwidth in the unlicensed radio frequency spectrum band and satisfy one or more regulatory requirements (e.g., a requirement that the CUBS 445 occupy at least 80% of the available frequency bandwidth). The CUBS 445 may in some examples take a form similar to that of an LTE/LTE-A cell-specific reference signal (CRS), an LTE/LTE-A preamble, and/or channel state information reference signal (CSI-RS). When the DCCA 440 fails, the CUBS 445 is not transmitted.

The S' subframe 435 may include 14 OFDM symbols, numbered 0 through 13 in FIG. 4. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a wireless device may transmit some amount of uplink data during the silent DL period. A second portion of the S' subframe 435 may be used for the DCCA 440. In the example 400, the S' subframe 435 includes seven DCCA slots, included in symbols 6 through 12. Use of the DCCA slots by different network operators may be coordinated to provide more efficient system operation. In some examples, in order to determine which of the seven possible DCCA slots to use to perform a DCCA 440, a base station 105 may evaluate a mapping-function of the form:

$$F_D(\text{GroupID}, t) \in \{1,2,3,4,5,6,7\}$$

where GroupID is a "deployment group-id" assigned to the base station 105, and t is the LBT radio frame number corresponding to a gating interval or frame for which the DCCA 440 is performed.

Figure 5:
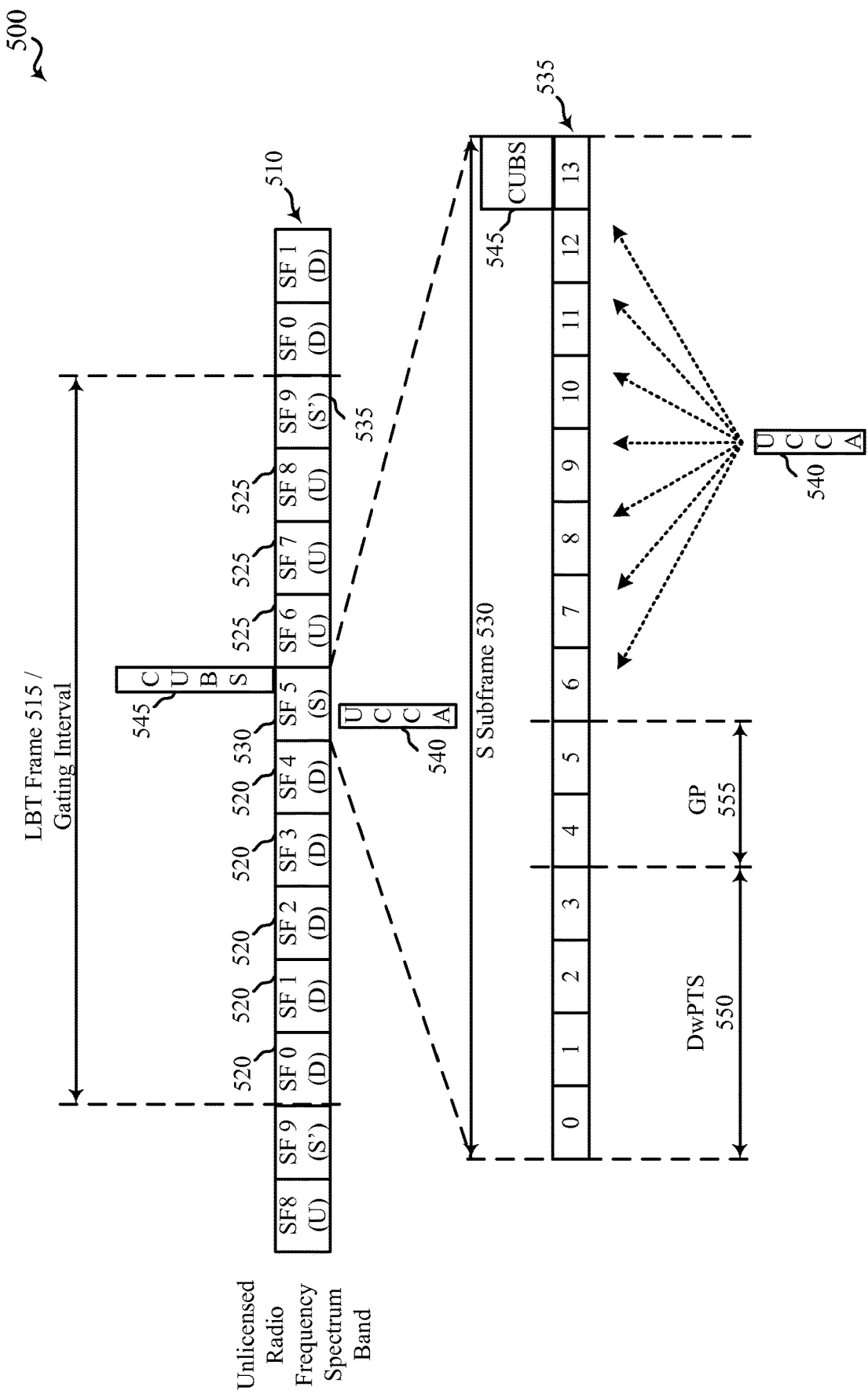
FIG. 5 shows an example of a wireless communication over an unlicensed radio frequency spectrum band, in accordance with various aspects of the present disclosure.

FIG. 5 shows an example 500 of a wireless communication 510 over an unlicensed radio frequency spectrum band, in accordance with various aspects of the present disclosure. An LBT radio frame 515, which may correspond to a gating interval such as the first gating interval 305 described with reference to FIG. 3 and/or the LBT radio frame 415 described with reference to FIG. 4, may have a duration of ten milliseconds and include a number of downlink subframes 520, a number of uplink subframes 525, and two types of special subframes (e.g., an S subframe 530 and an S' subframe 535. The S subframe 530 may provide a transition between downlink subframes 520 and uplink subframes 525, while the S' subframe 535 may provide a transition between uplink subframes 525 and downlink subframes 520. During the S subframe 530, an uplink CCA (UCCA) procedure 540 may be performed by one or more wireless devices, such as one or more of the wireless devices 115, 215, 215-a, 215-b, and/or 215-c described above with reference to FIGS. 1 and/or 2, to reserve, for a period of time, the channel over which the wireless communication 510 occurs. Following a successful UCCA 540 by a wireless device, the wireless device may transmit a CUBS 545 to provide an indication to other wireless devices and/or apparatuses (e.g., base stations, Wi-Fi access points, etc.) that the wireless device has reserved the channel. In some examples, a CUBS 545 may be transmitted using a plurality of interleaved resource blocks. Transmitting a CUBS 545 in this manner may enable the CUBS 545 to occupy at least a certain percentage of the available frequency bandwidth in the unlicensed radio frequency spectrum band and satisfy one or more regulatory requirements (e.g., a requirement that the CUBS 545 occupy at least 80% of the available frequency bandwidth). The CUBS 545 may in some examples take a form similar to that of an LTE/LTE-A cell-specific reference signal (CRS) and/or channel state information reference signal (CSI-RS). When the UCCA 540 fails, the CUBS 545 is not transmitted.

The S subframe 530 may include 14 OFDM symbols, numbered 0 through 13 in FIG. 5. A first portion of the S subframe 530, symbols 0 through 3 in this example, may be used as a downlink pilot time slot (DwPTS) 550, and a second portion of the S subframe 530 may be used as a guard period (GP) 555. A third portion of the S subframe 530 may be used for UCCA 540. In the example 500, the S subframe 530 includes seven UCCA slots, included in symbols 6 through 12. Use of the UCCA slots by different wireless devices may be coordinated to provide more efficient system operation. In some examples, in order to determine which of the seven possible UCCA slots to use to perform a UCCA 540, a wireless device may evaluate a mapping-function of the form:

$$F_U(\text{GroupID}, t) \in \{1,2,3,4,5,6,7\}$$

where GroupID is a "deployment group-id" assigned to the wireless device, and t is the LBT radio frame number corresponding to a frame for which a UCCA 540 is performed.

The mapping function for a DCCA 440 and/or a UCCA 540 may be constructed based at least in part on different criteria, depending on whether the mapping function will have an orthogonalization or a non-orthogonalization property. In examples with orthogonal LBT access, the mapping function may have an orthogonalization property according to:

$$F_{D/U}(x,t) \neq F_{D/U}(y,t)$$

$$\text{GroupID } x,y \in \{1,2,3,4,5,6,7\}$$

for all time t, whenever x≠y represent different group-ids. In this case, base stations and/or wireless devices with different group-ids may perform CCAs (e.g., DCCAs 440 and/or UCCAs 540) during non-overlapping CCA slots. In the absence of interference, the base station or wireless device with the group-id which maps to an earlier CCA slot may secure the channel for a period of time. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier CCA slot (and hence secure the channel in the absence of other interference) over a suitably long interval of time.

All base stations and wireless devices deployed by the same network operator/service-provider may be assigned the same group-id, so that they do not preempt each other in the contention process. This allows full frequency reuse among base stations and wireless devices of the same deployment, leading to enhanced system throughput. Base stations and/or wireless devices of different deployments may be assigned different group-ids, so that with orthogonal CCA slot mapping, access to the channel is mutually exclusive.

In examples with non-orthogonal, or overlapping, CCA slot access, the mapping function may allow more than seven group ids. In some situations, for example, it may be useful to support more than seven deployment group-ids, in which case it is not possible to maintain the orthogonality property of CCA slot mapping functions. In such cases, it may be desirable to reduce the frequency of collision between any two group-ids. In some examples, non-orthogonal CCA slot mapping sequences may also be used to provide fair channel access among deployments without tight coordination on LBT opportunities. One example of a non-orthogonal CCA slot mapping sequence is given by:

$$F_{D/U}(x,t) = R_{1,7}(x,t)$$

$$\text{GroupID } x = \in \{1, 2, \ldots 2^{16}\}$$

where $R_{1,7}(x,t)$ is a pseudo-random number generator between 1 and 7 chosen independently for GroupID x. In this case, there could be potential collisions between base stations and/or wireless devices of different GroupIDs in the same LBT radio frame t.

Thus, CCA slots may be selected according to the noted mapping functions and used for a DCCA 440 and/or a UCCA 540.

In some examples, power control may be provided for the downlink transmissions and/or the uplink transmissions of a wireless communication system. In some examples, power control may be provided for transmissions over an unlicensed radio frequency spectrum band. For power control of LTE/LTE-A downlink transmissions, including LTE/LTE-A downlink transmissions over an unlicensed radio frequency spectrum band, the total transmission power of downlink transmissions by a cell may be broadcast in a system information block one (SIB1). This may help a wireless device perform path loss measurements. In some examples, a common reference signal (CRS) in a downlink transmission may be power boosted. While power control for control/data downlink transmissions may be largely unspecified and left to implementation, there may be some practical limitations on power control for control/data downlink transmissions. For example, power boosting of control/data downlink transmissions may be limited to no more than a threshold (e.g., 6 dB). In some examples, traffic to pilot power ratio (TPR) may be fixed for high modulation orders (16 quadrature amplitude modulation (16 QAM) and above) of CRS based physical downlink shared channel (PDSCH). TPR may also be fixed for demodulation reference signal (DM-RS) based PDSCH.

For power control of LTE/LTE-A uplink transmissions, including LTE/LTE-A uplink transmissions over an unlicensed radio frequency spectrum band, both open-loop and closed-loop power control may be supported. In some examples, an accumulative power control mode and/or an absolute power control mode may be supported for physical uplink shared channel (PUSCH) power control and/or sounding reference signal (SRS) power control. A wireless device may be configured on higher layers regarding which power control mode (accumulative and/or absolute) is to be used by the wireless device for PUSCH power control and/or SRS power control. In some examples, a configurable power offset may be provided between SRS power control and PUSCH power control. A bandwidth difference between SRS power control and PUSCH power control may also be provided for. In some examples, only an accumulative power mode may be supported for physical uplink control channel (PUCCH) power control.

In an LTE/LTE-A network, power control for downlink transmissions and/or uplink transmissions may be provided on a per subframe basis.

Figure 6:
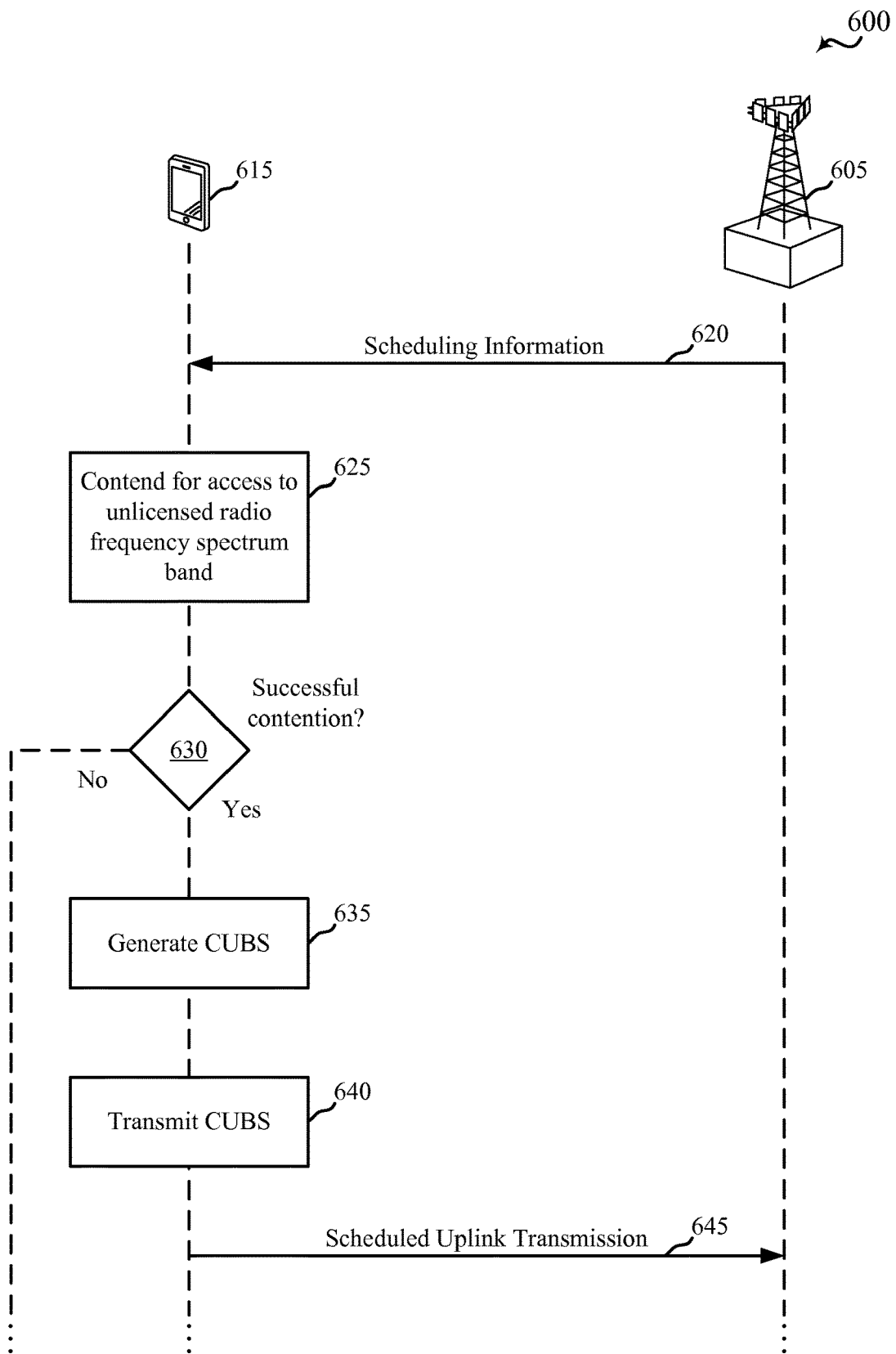
FIG. 6 shows a message flow between a base station (e.g., a base station forming part or all of an eNB) and a wireless device, in accordance with various aspects of the present disclosure.

FIG. 6 shows a message flow 600 between a base station 605 (e.g., a base station forming part or all of an eNB) and a wireless device 615, in accordance with various aspects of the present disclosure. In some examples, the base station 605 may be an example of aspects of one or more of the base stations 105, 205, and/or 205-a described with reference to FIGS. 1 and/or 2, and the wireless device 615 may be an example of aspects of one or more of the wireless devices 115, 215, 215-a, 215-b, and/or 215-c described with reference to FIGS. 1 and/or 2. In some examples, the base station 605 and wireless device 615 may be configured to communicate in a supplemental downlink mode, a carrier aggregation mode, and/or a standalone mode over an unlicensed radio frequency spectrum band (e.g., a radio frequency spectrum band for which apparatuses may need to contend for access because the radio frequency spectrum band is available, at least in part, for unlicensed use, such as Wi-Fi use).

In some examples, the message flow 600 may begin with a transmission, from the base station 605 to the wireless device 615, of scheduling information 620 for an uplink transmission by the wireless device 615. In some examples, the received scheduling information 620 may include an indication of the frequency tone set allocated to the scheduled uplink transmission. In some examples, the frequency tone set may be indicated in the form of resource blocks or resource block interlaces. A resource block interface may include a plurality of resource blocks separated by other resource blocks in the frequency domain. In some examples, scheduling information 620 for the uplink transmission may also or alternatively be received from a base station other than the base station 605. In some examples, the scheduling information 620 for the uplink transmission may be based at least in part on a static or semi-static schedule, and may be used to schedule more than one uplink transmission. In some examples, the scheduling information 620 may be transmitted over an unlicensed radio frequency spectrum band. In some examples, the scheduling information 620 may be transmitted over a licensed radio frequency spectrum band.

At block 625, the wireless device 615 may contend for access to the unlicensed radio frequency spectrum band. Contending for access to the unlicensed radio frequency spectrum band may include performing a UCCA. At block 630, the wireless device 615 may determine whether the UCCA was successful (e.g., the wireless device 615 may determine whether the unlicensed radio frequency spectrum band, or a channel thereof, is clear for access).

When the wireless device 615 successfully contends for access to the unlicensed radio frequency spectrum band, the wireless device 615 may generate a CUBS at block 635. A waveform of the CUBS may be based at least in part on a scheduled uplink transmission 645 by the wireless device 615. In some examples, the scheduled uplink transmission on which the CUBS is based may include a PUSCH transmission, a PUCCH transmission, and/or an SRS transmission. In some examples, the scheduled uplink transmission on which the CUBS is based may include the SRS transmission multiplexed with at least one of the PUSCH transmission or the PUCCH transmission.

In some examples, the waveform of the CUBS generated at block 635 may also or alternatively be generated based at least in part on an identity of the wireless device 615 and/or an identity of a transmission period in which the scheduled uplink transmission is initially scheduled. In some examples, the transmission period in which the scheduled uplink transmission is initially scheduled may be an LBT frame, a base station synchronization frame, or a subframe, and the identity of the transmission period in which the scheduled uplink transmission is initially scheduled may be a current or previous LBT frame, base station synchronization frame, or subframe. The identified transmission period may be a previous transmission period when, for example, the wireless device is unable to successfully contend for access to an unlicensed radio frequency spectrum band for the transmission period in which the scheduled uplink transmission is initially scheduled.

In some examples, generating the CUBS may include matching a bandwidth of the CUBS to a bandwidth of the scheduled uplink transmission 645. In some examples, matching the bandwidth of the CUBS to the bandwidth of the scheduled uplink transmission 645 may include matching a bandwidth of the CUBS to a frequency tone set allocated to the scheduled uplink transmission 645. In some examples, matching the bandwidth of the CUBS to the bandwidth of the scheduled uplink transmission 645 may include matching a number of resource block interlaces associated with the CUBS to a number of resource block interlaces associated with the scheduled uplink transmission 645. In some examples, matching the bandwidth of the CUBS to the bandwidth of the scheduled uplink transmission 645 may include matching a total number of resource blocks used to transmit the CUBS to a total number of resource blocks associated with the scheduled uplink transmission 645.

In some examples, generating the CUBS may include matching a transmit power of the CUBS to a transmit power of the scheduled uplink transmission 645.

In some examples, generating the CUBS may include duplicating at least a portion of the scheduled uplink transmission 645 (e.g., at least a portion of the payload of the scheduled uplink transmission 645) in the CUBS.

At block 640, the wireless device 615 may transmit the CUBS over the unlicensed radio frequency spectrum band to occupy the unlicensed radio frequency spectrum band prior to the scheduled uplink transmission 645.

In some examples, the wireless device 615 may include a first wireless device, and the scheduled uplink transmission may include a first scheduled uplink transmission of a plurality of scheduled uplink transmissions to the base station 605 during a transmission period. The plurality of scheduled uplink transmissions may also include a second scheduled uplink transmission by a second wireless device. In these examples, the first scheduled uplink transmission may differ from the second scheduled uplink transmission, and thus, the first CUBS may differ from a second CUBS transmitted over the unlicensed radio frequency spectrum band to occupy the unlicensed radio frequency spectrum band prior to the second scheduled uplink transmission.

In some examples, the scheduled uplink transmission may include a first scheduled uplink transmission, and the CUBS may include a first CUBS. In these examples, the wireless device 615 may further generate a second CUBS. A waveform of the second CUBS may be based at least in part on a second scheduled uplink transmission by the wireless device 615. The wireless device 615 may transmit the second CUBS over the unlicensed radio frequency spectrum band to occupy the unlicensed radio frequency spectrum band prior to the second scheduled uplink transmission.

By way of example, the message flow 600 concludes with a transmission, by the wireless device 615, of the scheduled uplink transmission 645.

When the wireless device does not successfully contend for access to the unlicensed radio frequency spectrum, the operations at block 635 and block 640 may not be performed, and the scheduled uplink transmission 645 may not be made. Alternatively, the CUBS may be generated at block 635, but the CUBS may not be transmitted at block 640, and the scheduled uplink transmission 645 may not be made.

In some examples, the base station 605 may provide scheduling information to a plurality of wireless devices such as the wireless device 615. In such examples, the base station 605 may monitor for CUBS from each of the plurality of wireless devices, to determine which of the wireless devices successfully contended for access to the unlicensed radio frequency spectrum band. Because different ones of the wireless devices may successfully contend for access to the unlicensed radio frequency spectrum band at different times, and sometimes in different LBT radio frames, the base station 605 may monitor fur the CUBS over an extended period of time. In some examples, a wireless device may indicate in a CUBS whether a subsequent uplink transmission was scheduled for transmission during a previous frame or a current frame.

In general, CUBS may be transmitted by a wireless device such as the wireless device 615 to contend for access to the unlicensed radio frequency spectrum band during an LBT radio frame, a base station (or eNB) synchronization frame, and/or a subframe, and therefore be generated as a function of an LBT radio frame, a base station (or eNB) synchronization frame, and/or a subframe.

Turning now to a scheduled uplink transmission including a PUCCH transmission and/or PUSCH transmission, a conventional LTE/LTE-A PUCCH transmission and/or PUSCH transmission may only occupy one resource block in the frequency domain (e.g., only a small subset of contiguous frequency tones within a radio frequency spectrum band). However, there may be a requirement that certain communications in an unlicensed radio frequency spectrum band (e.g., LTE/LTE-A communications in an unlicensed radio frequency spectrum band) occupy at least a certain percentage of the available frequency bandwidth (e.g., at least 80% of the available frequency bandwidth) in the unlicensed radio frequency spectrum band. To meet such a requirement, a PUCCH transmission and/or PUSCH transmission may in some examples be transmitted over one or more resource block interlaces in the frequency domain, where a resource block interlace includes a plurality of resources blocks. In some examples, an unlicensed radio frequency spectrum band may be divided into ten resource block interlaces, with each resource block interlace including ten resource blocks. With such a configuration of resource blocks and resource block interlaces, a PUCCH transmission and/or PUSCH transmission may in some examples be scheduled on one or more of the resource block interlaces (e.g., one or more sets of ten spaced apart resource blocks).

Figure 7:
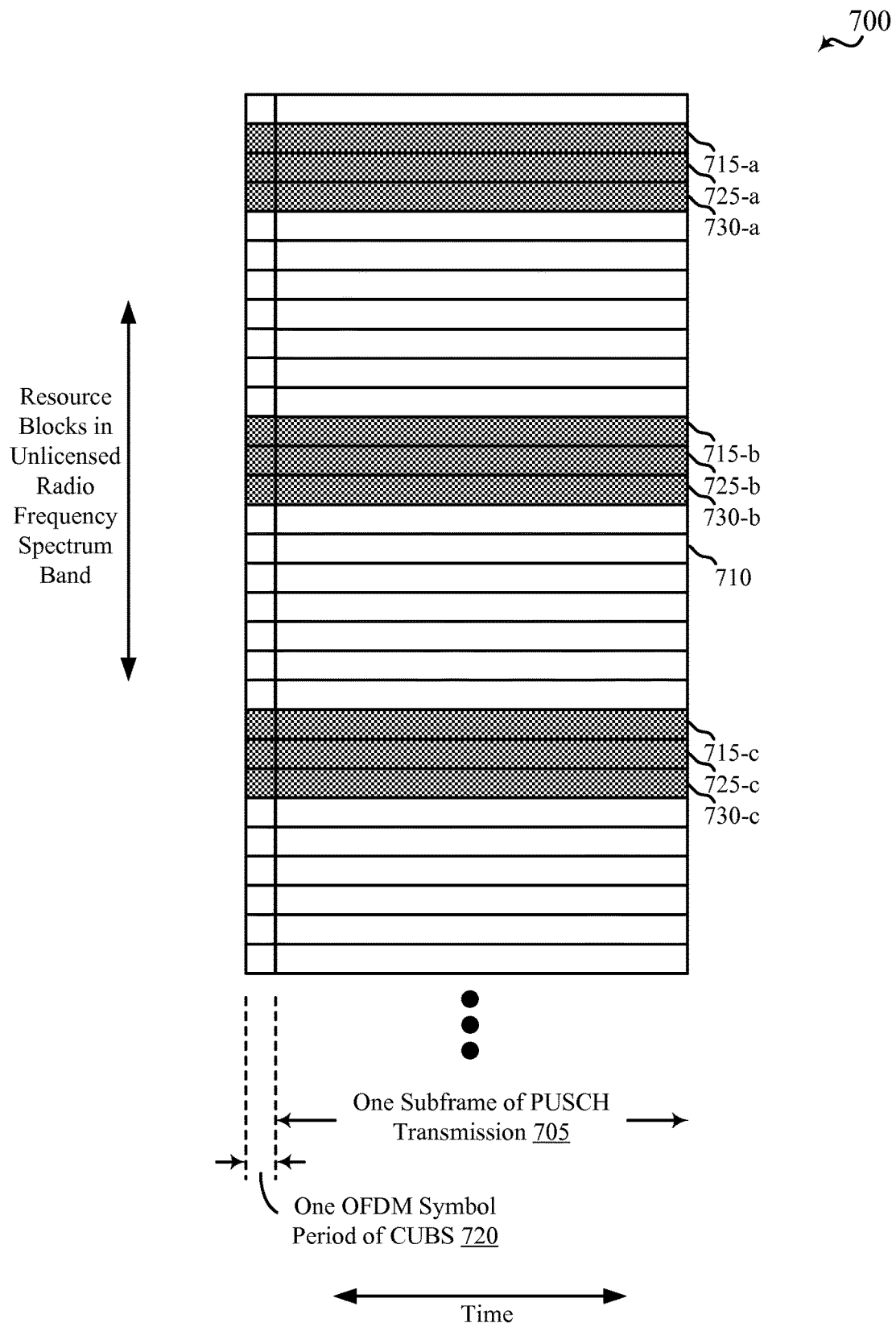
FIG. 7 shows an example transmission of a CUBS and a PUSCH over an unlicensed radio frequency spectrum band, in accordance with various aspects of the present disclosure.

FIG. 7 shows an example transmission 700 of a CUBS 720 and a PUSCH transmission 705 over an unlicensed radio frequency spectrum band, in accordance with various aspects of the present disclosure. By way of example, FIG. 7 may show only a subset of the resource blocks 710 in the unlicensed radio frequency spectrum band. In some examples, the unlicensed radio frequency spectrum band may include one hundred resource blocks 710. FIG. 7 only shows thirty resource blocks. In other examples, the unlicensed radio frequency spectrum band may include any number of resource blocks. Each resource block may include one or more frequency tones. Also by way of example, FIG. 7 shows one OFDM symbol period of a CUBS 720, and one subframe of a PUSCH transmission 705. In other examples, the CUBS 720 may be transmitted over multiple OFDM symbol periods and/or fractional OFDM symbol periods, and the PUSCH transmission 705 may be transmitted over multiple subframes, OFDM symbol periods, and/or fractional OFDM symbol periods.

A PUSCH transmission 705 may in some examples be scheduled on one or more resource block interlaces (e.g., a first resource block interface 715 including a first resource block 715-$a$, a second resource block 715-$b$, and a third resource block 715-$c$; a second resource block interface 725 including a first resource block 725-$a$, a second resource block 725-$b$, and a third resource block 725-$c$; and/or a third resource block interface 730 including a first resource block 730-$a$, a second resource block 730-$b$, and a third resource block 730-$c$). Because the PUSCH transmission 705 is scheduled in advance (e.g., 4 ms in advance, in some examples), a CUBS 720 may be generated based at least in part on the PUSCH transmission 705. For example, a bandwidth of the CUBS 720 may be matched to a bandwidth of the PUSCH transmission 705. In some examples, matching the bandwidth of the CUBS 720 to the bandwidth of the PUSCH transmission 705 may include matching a bandwidth of the CUBS 720 to a frequency tone set allocated to the PUSCH transmission 705 (e.g., the resource block interlaces 715, 725, and 730).

In some examples, the CUBS 720 may also or alternatively be generated by matching a transmit power of the CUBS 720 to a transmit power of the PUSCH transmission 705.

In some examples, the CUBS 720 may also or alternatively be generated by duplicating at least a portion of the PUSCH transmission 705 (e.g., at least a portion of the payload of the PUSCH transmission 705) in the CUBS 720. Duplicating the payload of the PUSCH transmission 705 may enable a receiver at a base station to combine the CUBS 720 with the PUSCH transmission 705.

Figure 8:
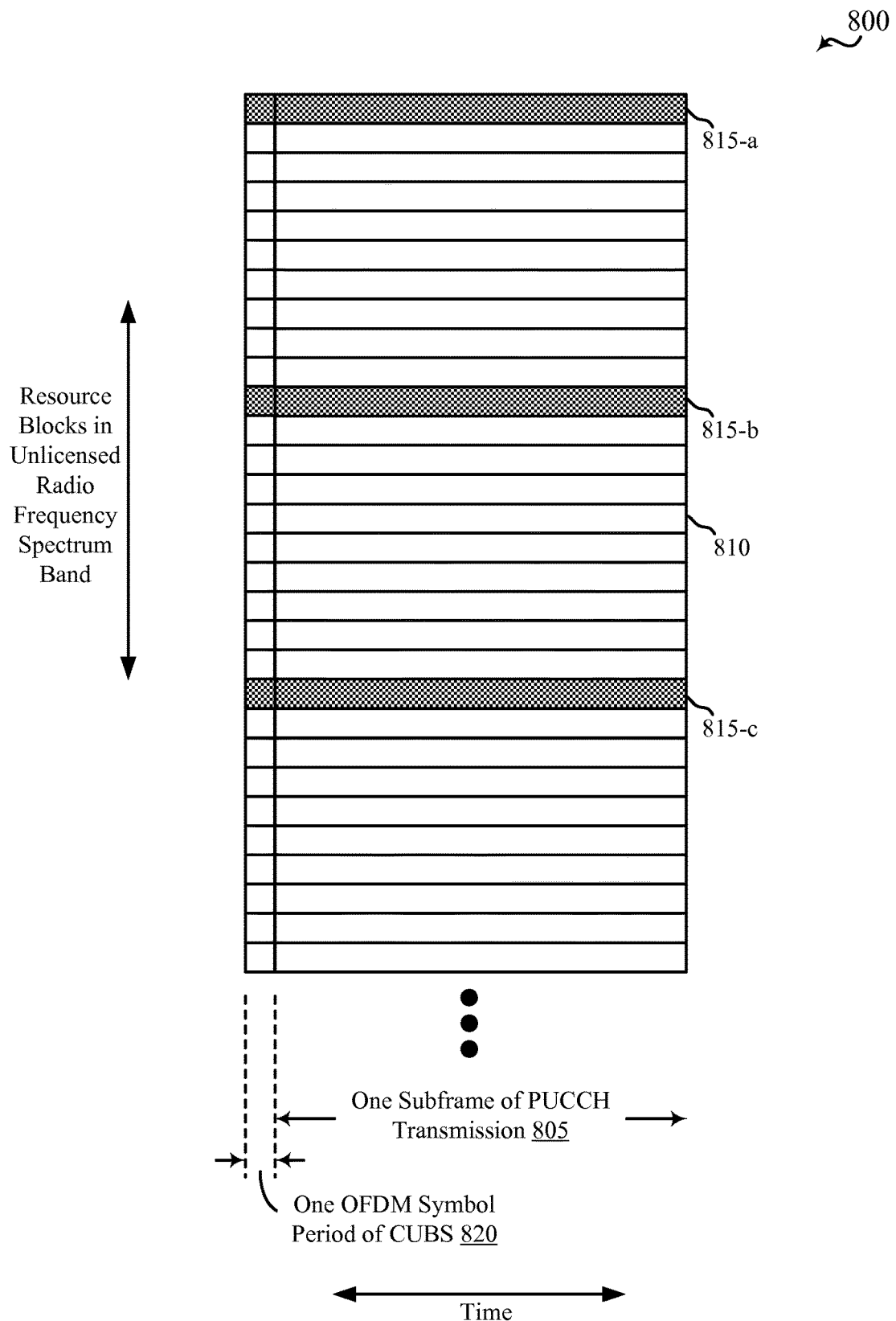
FIG. 8 shows an example transmission of a CUBS and a PUCCH over an unlicensed radio frequency spectrum band, in accordance with various aspects of the present disclosure.

FIG. 8 shows an example transmission 800 of a CUBS 820 and a PUCCH transmission 805 over an unlicensed radio frequency spectrum band, in accordance with various aspects of the present disclosure. By way of example, FIG. 8 may show only a subset of the resource blocks 810 in the unlicensed radio frequency spectrum band. In some examples, the unlicensed radio frequency spectrum band may include one hundred resource blocks 810. FIG. 8 only shows thirty resource blocks. In other examples, the unlicensed radio frequency spectrum band may include any number of resource blocks. Each resource block may include one or more frequency tones. Also by way of example, FIG. 8 shows one OFDM symbol period of a CUBS 820, and one subframe of a PUCCH transmission 805. In other examples, the CUBS 820 may be transmitted over multiple OFDM symbol periods and/or fractional OFDM symbol periods, and the PUCCH transmission 805 may be transmitted over multiple subframes, OFDM symbol periods, and/or fractional OFDM symbol periods.

A PUCCH transmission 805 may in some examples have a predetermined resource block allocation. For example, a PUCCH transmission associated with periodic channel state information (CSI) transmission and/or aperiodic CSI transmission may be configured/triggered in advance of the PUCCH transmission. Similarly, a PUCCH transmission having scheduled acknowledgements (ACKs) may be configured/triggered in advance of the PUCCH transmission. As shown in FIG. 8, a PUCCH transmission 805 may be scheduled on a resource block interlace 815 including a plurality of resource blocks, such as a first resource block 815-$a$, a second resource block 815-$b$, and a third resource block 815-$c$. Because the PUCCH transmission 805 is configured/triggered in advance, a CUBS 820 may be generated based at least in part on the PUCCH transmission 805. For example, a bandwidth of the CUBS 820 may be matched to a bandwidth of the PUCCH transmission 805. In some examples, matching the bandwidth of the CUBS 820 to the bandwidth of the PUCCH transmission 805 may include matching a bandwidth of the CUBS 820 to a frequency tone set allocated to the PUCCH transmission 805 (e.g., the resource block interlace 815).

In some examples, the CUBS 820 may also or alternatively be generated by matching a transmit power of the CUBS 820 to a transmit power of the PUCCH transmission 805.

In some examples, the CUBS 820 may also or alternatively be generated by duplicating at least a portion of the PUCCH transmission 805 (e.g., at least a portion of the payload of the PUCCH transmission 805) in the CUBS 820. Duplicating the payload of the PUCCH transmission 805 may enable a receiver at a base station to combine the CUBS 820 with the PUCCH transmission 805.

Figure 9:
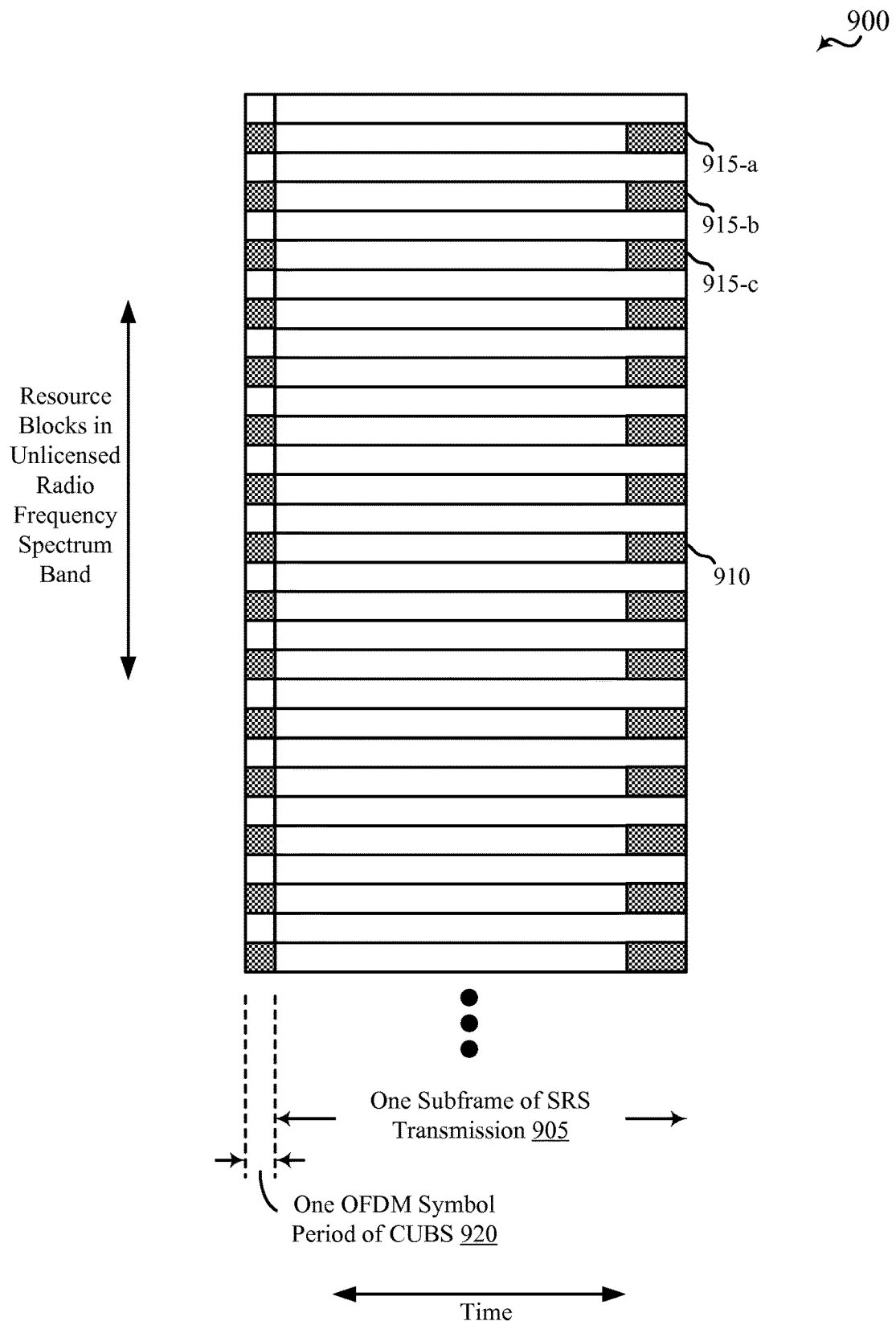
FIG. 9 shows an example transmission of a CUBS and an SRS over an unlicensed radio frequency spectrum band, in accordance with various aspects of the present disclosure.

FIG. 9 shows an example transmission 900 of a CUBS 920 and an SRS transmission 905 over an unlicensed radio frequency spectrum band, in accordance with various aspects of the present disclosure. By way of example, FIG. 9 may show only a subset of the resource blocks 910 in the unlicensed radio frequency spectrum band. In some examples, the unlicensed radio frequency spectrum band may include one hundred resource blocks 910. FIG. 9 only shows thirty resource blocks. In other examples, the unlicensed radio frequency spectrum band may include any number of resource blocks. Each resource block may include one or more frequency tones. Also by way of example, FIG. 9 shows one OFDM symbol period of a CUBS 920, and one subframe of an SRS transmission 905. In other examples, the CUBS 920 may be transmitted over multiple OFDM symbol periods and/or fractional OFDM symbol periods, and the SRS transmission 905 may be transmitted over multiple subframes, OFDM symbol periods, and/or fractional OFDM symbol periods.

An SRS transmission 905 may in some examples have a predetermined resource block allocation. For example, a periodic SRS transmission or aperiodic SRS transmission may be configured/triggered in advance of the SRS transmission. As shown in FIG. 9, an SRS transmission 905 may be scheduled on various resource blocks 915, including a first resource block 915-a, a second resource block 915-b, and a third resource block 915-c. Because the SRS transmission 905 is configured/triggered in advance, a CUBS 920 may be generated based at least in part on the SRS transmission 905. For example, a bandwidth of the CUBS 920 may be matched to a bandwidth of the SRS transmission 905. In some examples, matching the bandwidth of the CUBS 920 to the bandwidth of the SRS transmission 905 may include matching a bandwidth of the CUBS 920 to a frequency tone set allocated to the SRS transmission 905.

In some examples, the CUBS 920 may also or alternatively be generated by matching a transmit power of the CUBS 920 to a transmit power of the SRS transmission 905.

In some examples, a scheduled uplink transmission may include more than one type of uplink transmission. For example, a scheduled uplink transmission may include an SRS transmission and at least one of a PUSCH transmission or a PUCCH transmission. In some examples, at least one of the PUSCH transmission or the PUCCH transmission may be multiplexed with the SRS transmission. In these examples, a waveform of a CUBS may be generated based at least in part on a combined frequency tone set allocated to the SRS transmission and the at least one of the PUSCH transmission or the PUCCH transmission.

In other examples, the SRS transmission may be scheduled for transmission on a different OFDM symbol than the at least one of the PUSCH transmission or the PUCCH transmission. In these examples, a waveform of the CUBS may be generated based at least in part on a frequency tone set allocated to the PUSCH transmission or the PUCCH transmission. Also, a power-related parameter of the SRS transmission may be matched to a power-related parameter of at least one of the PUSCH transmission or the PUCCH transmission. In some examples, matching a power-related parameter of the SRS transmission to a power-related parameter of at least one of the PUSCH transmission or the PUCCH transmission may include matching a total transmit power of the SRS transmission to a total transmit power of the at least one of the PUSCH transmission or the PUCCH transmission. In some examples, matching a power-related parameter of the SRS transmission to a power-related parameter of at least one of the PUSCH transmission or the PUCCH transmission may include matching a power spectral density of the SRS transmission to a power spectral density of the at least one of the PUSCH transmission or the PUCCH transmission. In some examples, the SRS transmission may be transmitted as a last symbol of the scheduled uplink transmission.

Figure 10:
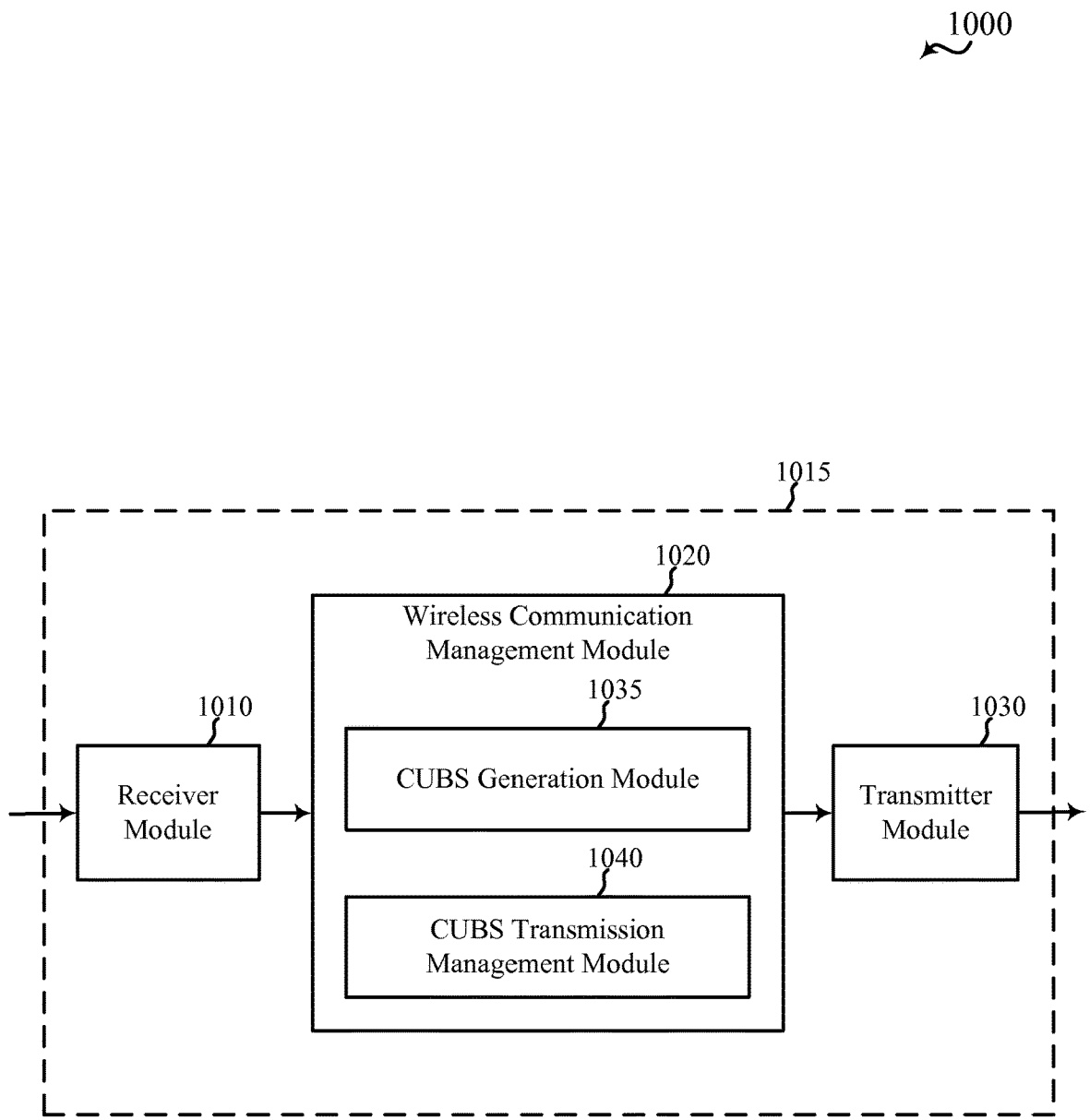
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the wireless devices 115, 215, 215-a, 215-b, 215-c, and/or 615 described with reference to FIGS. 1, 2, and/or 6. The apparatus 1005 may also be a processor. The apparatus 1005 may include a receiver module 1010, a wireless communication management module 1020, and/or a transmitter module 1030. Each of these components may be in communication with each other.

The components of the apparatus 1005 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors In some examples, the receiver module 1010 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available, at least in part, for unlicensed use. such as Wi-Fi use). In some examples, the licensed radio frequency spectrum band and/or the unlicensed radio frequency spectrum band may be used for LTE/LTE-A communications, as described, for example, with reference to FIGS. 1, 2, 3, 4, 5, 6, 7, 8, and/or 9. The receiver module 1010 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1030 may include at least one RF transmitter, such as at least one RF transmitter operable to transmit over the licensed radio frequency spectrum band and/or the unlicensed radio frequency spectrum band. The transmitter module 1030 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1020 may be used to manage one or more aspects of wireless communication for the apparatus 1005. In some examples, the wireless communication management module 1020 may include a CUBS generation module 1035 and/or a CUBS transmission management module 1040. Each of these components may be in communication with each other.

In some examples, the CUBS generation module 1035 may be used to generate a CUBS. The CUBS generation module 1035 may generate a waveform of the CUBS based at least in part on a scheduled uplink transmission by the apparatus 1005. In some examples, the scheduled uplink transmission may include a PUSCH transmission, a PUCCH transmission, and/or an SRS transmission. In some examples, the scheduled uplink transmission may include the SRS transmission multiplexed with at least one of the PUSCH transmission or the PUCCH transmission.

In some examples, the waveform of the CUBS generated by the CUBS generation module 1035 may also or alternatively be generated based at least in part on an identity of the apparatus 1005 and/or an identity of a transmission period in which the scheduled uplink transmission is initially scheduled. In some examples, the transmission period in which the scheduled uplink transmission is initially scheduled may be an LBT frame, a base station synchronization frame, or a subframe, and the identity of the transmission period in which the scheduled uplink transmission is initially scheduled may be a current or previous LBT frame, base station synchronization frame, or subframe. The identified transmission period may be a previous transmission period when, for example, the apparatus 1005 is unable to successfully contend for access to an unlicensed radio frequency spectrum band for the transmission period in which the scheduled uplink transmission is initially scheduled.

In some examples, the CUBS transmission management module 1040 may be used to transmit the CUBS over an unlicensed radio frequency spectrum band to occupy the unlicensed radio frequency spectrum band prior to the scheduled uplink transmission.

In some examples, the apparatus 1005 may include a first wireless device, and the scheduled uplink transmission may include a first scheduled uplink transmission of a plurality of scheduled uplink transmissions to a base station during a transmission period. The plurality of scheduled uplink transmissions may also include a second scheduled uplink transmission by a second wireless device. In these examples, the first scheduled uplink transmission may differ from the second scheduled uplink transmission, and thus, the first CUBS may differ from a second CUBS transmitted over the unlicensed radio frequency spectrum band to occupy the unlicensed radio frequency spectrum band prior to the second scheduled uplink transmission.

In some examples, the scheduled uplink transmission may include a first scheduled uplink transmission, and the CUBS may include a first CUBS. In these examples, the CUBS generation module 1035 may be used to generate a second CUBS. A waveform of the second CUBS may be based at least in part on a second scheduled uplink transmission by the apparatus 1005. The CUBS transmission management module 1040 may be used to transmit the second CUBS over the unlicensed radio frequency spectrum band to occupy the unlicensed radio frequency spectrum band prior to the second scheduled uplink transmission.

Figure 11:
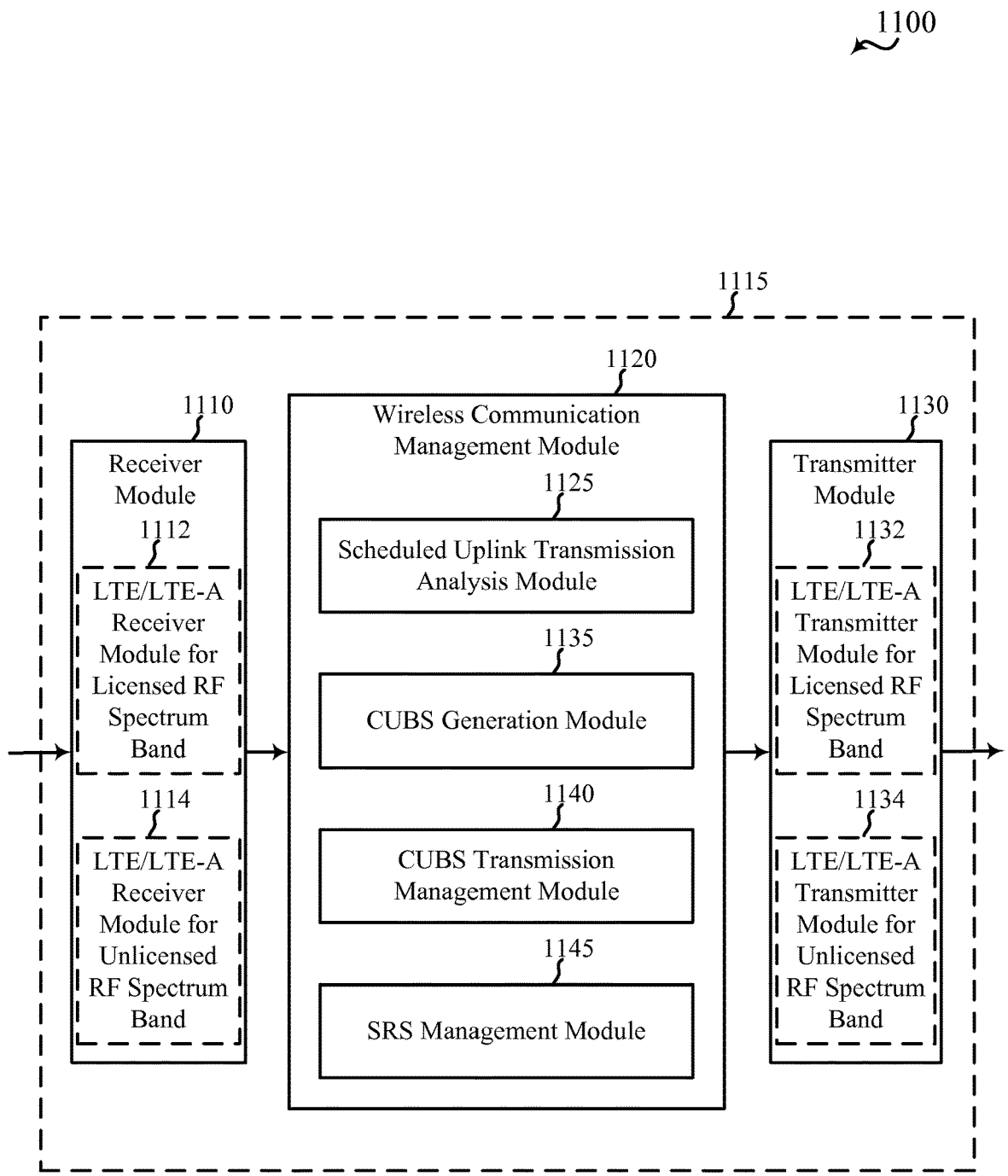
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. In some examples, the apparatus 1105 may be an example of aspects of one or more of the wireless devices 115, 215, 215-a, 215-b, 215-c, and/or 615 described with reference to FIGS. 1, 2, and/or 6, and/or aspects of the apparatus 1005 described with reference to FIG. 10. The apparatus 1105 may also be a processor. The apparatus 1105 may include a receiver module 1110, a wireless communication management module 1120, and/or a transmitter module 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors In some examples, the receiver module 1110 may be an example of one or more aspects of the receiver module 1010 described with reference to FIG. 10. In some examples, the receiver module 1110 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available, at least in part, for unlicensed use. such as Wi-Fi use). In some examples, the licensed radio frequency spectrum band and/or the unlicensed radio frequency spectrum band may be used for LTE/LTE-A communications, as described, for example, with reference to FIGS. 1, 2, 3, 4, 5, 6, 7, 8, and/or 9. The receiver module 1110 may in some cases include separate receivers for the licensed radio frequency spectrum band and the unlicensed radio frequency spectrum band. The separate receivers may, in some examples, take the form of an LTE/LTE-A receiver module for licensed radio frequency spectrum band 1112, for communicating over the licensed radio frequency spectrum band, and an LTE/LTE-A receiver module for unlicensed radio frequency spectrum band 1114, for communicating over the unlicensed radio frequency spectrum band. The receiver module 1110 may also include receiver modules for communicating over other radio frequency spectrum bands and/or for communicating via other radio access technologies (e.g., Wi-Fi). The receiver module 1110, including the LTE/LTE-A receiver module for licensed radio frequency spectrum band 1112 and the LTE/LTE-A receiver module for unlicensed radio frequency spectrum band 1114 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1130 may include at least one RF transmitter, such as at least one RF transmitter operable to transmit over the licensed radio frequency spectrum band and/or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of an LTE/LTE-A transmitter module for licensed radio frequency spectrum band 1132, for communicating over the licensed radio frequency spectrum band, and an LTE/LTE-A transmitter module for unlicensed radio frequency spectrum band 1134, for communicating over the unlicensed radio frequency spectrum band. The transmitter module 1130 may also include transmitter modules for communicating over other radio frequency spectrum bands and/or for communicating via other radio access technologies (e.g., Wi-Fi). The transmitter module 1130, including the LTE/LTE-A transmitter module for licensed radio frequency spectrum band 1132 and the LTE/LTE-A transmitter module for unlicensed radio frequency spectrum band 1134 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1120 may be used to manage one or more aspects of wireless communication for the apparatus 1105. In some examples, the wireless communication management module 1120 may be an example of one or more aspects of the wireless communication management module 1020 described with reference to FIG. 10. In some examples, the wireless communication management module 1120 may include a scheduled uplink transmission analysis module 1125, a CUBS generation module 1135, a CUBS transmission management module 1140, and/or an SRS management module 1145. Each of these components may be in communication with each other.

In some examples, the scheduled uplink transmission analysis module 1125 may be used to determine a frequency tone set allocated to a scheduled uplink transmission by the apparatus 1105. In some examples, the scheduled uplink transmission may include a PUSCH transmission, a PUCCH transmission, and/or an SRS transmission. In some examples, the scheduled uplink transmission may include the SRS transmission multiplexed with at least one of the PUSCH transmission or the PUCCH transmission.

In some examples, determining the frequency tone set allocated to the scheduled uplink transmission may include determining the frequency tone set allocated to the scheduled uplink transmission based at least in part on a static or semi-static schedule associated with the scheduled uplink transmission. In some examples, determining the frequency tone set allocated to the scheduled uplink transmission may include receiving an indication of the frequency tone set allocated to the scheduled uplink transmission from a base station.

In some examples, the CUBS generation module 1135 may be an example of one or more aspects of the CUBS generation module 1035 described with reference to FIG. 10. In some examples, the CUBS generation module 1135 may be used to generate a CUBS. The CUBS generation module 1135 may generate a waveform of the CUBS based at least in part on a scheduled uplink transmission by the apparatus 1105. In some examples, the scheduled uplink transmission may include a PUSCH transmission, a PUCCH transmission, and/or an SRS transmission. In some examples, the scheduled uplink transmission may include the SRS transmission multiplexed with at least one of the PUSCH transmission or the PUCCH transmission.

In some examples, the CUBS transmission management module 1140 may be an example of one or more aspects of the CUBS transmission management module 1040 described with reference to FIG. 10. In some examples, the CUBS transmission management module 1140 may be used to transmit the CUBS over an unlicensed radio frequency spectrum band to occupy the unlicensed radio frequency spectrum band prior to the scheduled uplink transmission.

In some examples, the SRS management module 1145 may be used to match a power-related parameter of an SRS transmission to a power-related parameter of at least one of a PUSCH transmission or a PUCCH transmission. In some examples, matching a power-related parameter of an SRS transmission to a power-related parameter of at least one of a PUSCH transmission or a PUCCH transmission may include matching a total transmit power of the SRS transmission to a total transmit power of at least one of the PUSCH transmission or the PUCCH transmission. In some examples, matching a power-related parameter of an SRS transmission to a power-related parameter of at least one of a PUSCH transmission or a PUCCH transmission may include matching a power spectral density of the SRS transmission to a power spectral density of the at least one of the PUSCH transmission or the PUCCH transmission.

In some examples, the SRS management module 1145 may also be used to transmit an SRS transmission as a last symbol of a scheduled uplink transmission.

Figure 12:
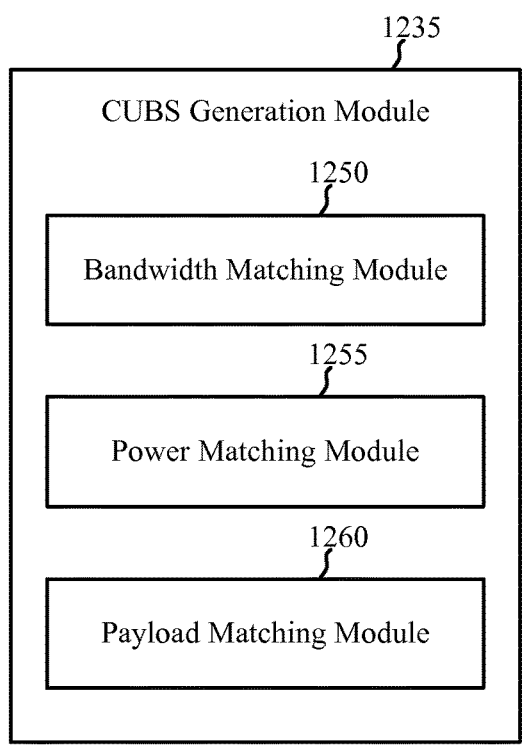
FIG. 12 shows a block diagram of a CUBS generation module, in accordance with various aspects of the present disclosure.

FIG. 12 shows a block diagram 1200 of a CUBS generation module 1235, in accordance with various aspects of the present disclosure. In some examples, the CUBS generation module 1235 may be an example of aspects of one or more of the CUBS generation modules 1035 and/or 1135 described with reference to FIGS. 10 and/or 11. The CUBS generation module 1235 may include a bandwidth matching module 1250, a power matching module 1255, and/or a payload matching module 1260. Each of these components may be in communication with each other.

In some examples, the bandwidth matching module 1250 may be used to match a bandwidth of the CUBS to a bandwidth of a scheduled uplink transmission In some examples, matching the bandwidth of a CUBS to the bandwidth of a scheduled uplink transmission may include matching a bandwidth of the CUBS to a frequency tone set allocated to the scheduled uplink transmission. In some examples, matching the bandwidth of a CUBS to the bandwidth of a scheduled uplink transmission may include matching a number of resource block interlaces associated with the CUBS to a number of resource block interlaces associated with the scheduled uplink transmission. In some examples, matching the bandwidth of a CUBS to the bandwidth of a scheduled uplink transmission may include matching a total number of resource blocks used to transmit the CUBS to a total number of resource blocks associated with the scheduled uplink transmission.

In some examples, the power matching module 1255 may be used to match a transmit power of the CUBS to a transmit power of a scheduled uplink transmission.

In some examples, the payload matching module 1260 may be used to duplicate at least a portion of a scheduled uplink transmission (e.g., at least a portion of the payload of the scheduled uplink transmission) in a CUBS.

Figure 13:
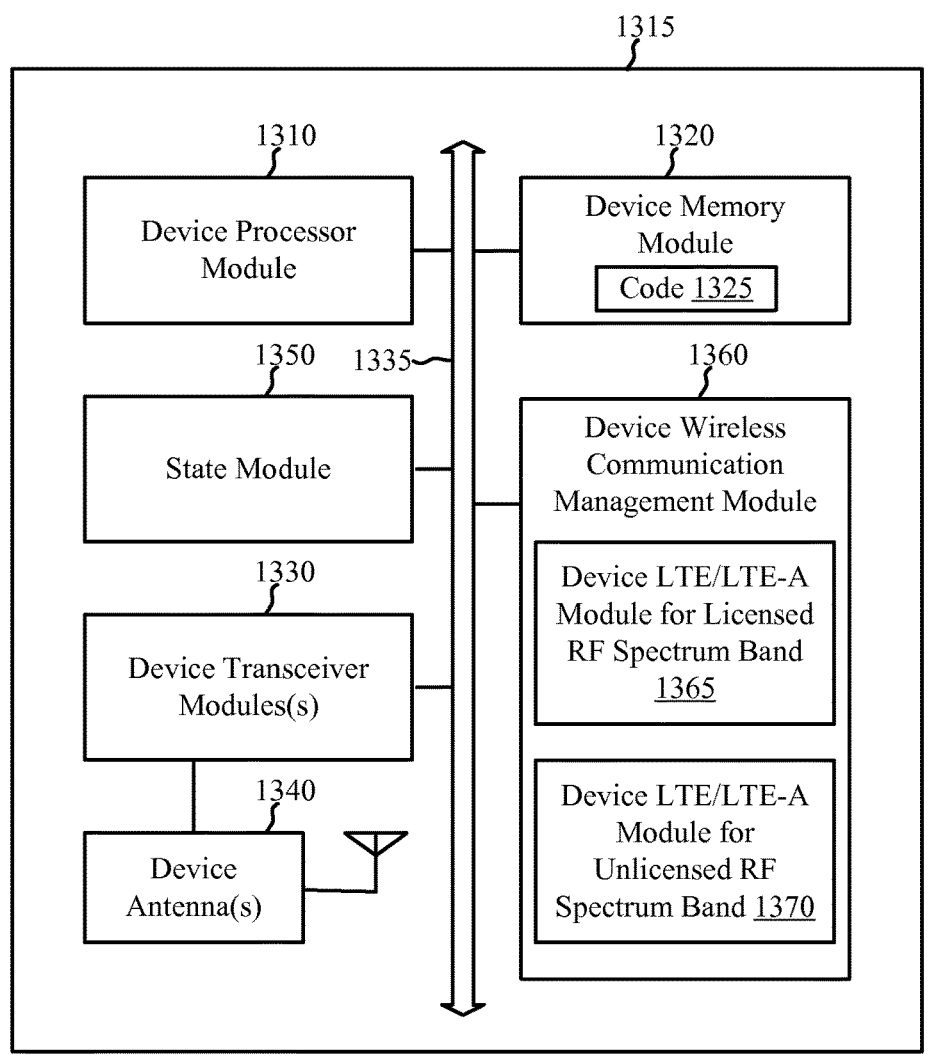
FIG. 13 shows a block diagram of a wireless device (e.g., a UE capable of communicating with one or more base stations) for use in wireless communication, in accordance with various aspects of the present disclosure.

FIG. 13 shows a block diagram 1300 of a wireless device 1315 (e.g., a UE capable of communicating with one or more base stations) for use in wireless communication, in accordance with various aspects of the present disclosure. The wireless device 1315 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The wireless device 1315 may, in some examples, have an internal power supply (not shown), such as a small battery, to facilitate mobile operation. In some examples, the wireless device 1315 may be an example of aspects of one or more of the wireless devices 115, 215, 215-*a*, 215-*b*, 215-*c*, and/or 615 described with reference to FIGS. 1, 2, and/or 6, and/or aspects of one or more of the apparatuses 1015 and/or 1115 described with reference to FIGS. 10 and/or 11. The wireless device 1315 may be configured to implement at least some of the wireless device features and functions described with reference to FIGS. 1, 2, 3, 4, 5, 6, 7, 8, 9, 10, and/or 11.

The wireless device 1315 may include a device processor module 1310, a device memory module 1320, at least one device transceiver module (represented by device transceiver module(s) 1330), at least one device antenna (represented by device antenna(s) 1340), and/or a device wireless communication management module 1360. Each of these components may be in communication with each other, directly or indirectly, over one or more buses 1335.

The device memory module 1320 may include random access memory (RAM) and/or read-only memory (ROM). The device memory module 1320 may store computer-readable, computer-executable code 1325 containing instructions that are configured to, when executed, cause the device processor module 1310 to perform various functions described herein related to wireless communication, including, for example, the generation and transmission of CUBS. Alternatively, the code 1325 may not be directly executable by the device processor module 1310 but be configured to cause the wireless device 1315 (e.g., when compiled and executed) to perform various of the functions described herein.

The device processor module 1310 may include an intelligent hardware device, e.g., a CPU, a microcontroller, an ASIC, etc. The device processor module 1310 may process information received through the device transceiver module(s) 1330 and/or information to be sent to the device transceiver module(s) 1330 for transmission through the device antenna(s) 1340. The device processor module 1310 may handle, alone or in connection with the device wireless communication management module 1360, various aspects of communicating over (or managing communications over) a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band for which apparatuses may need to contend for access because the radio frequency spectrum band is available for unlicensed use, such as Wi-Fi use).

The device transceiver module(s) 1330 may include a modem configured to modulate packets and provide the modulated packets to the device antenna(s) 1340 for transmission, and to demodulate packets received from the device antenna(s) 1340. The device transceiver module(s) 1330 may, in some examples, be implemented as one or more device transmitter modules and one or more separate device receiver modules. The device transceiver module(s) 1330 may support communications in the first radio frequency spectrum band and/or the second radio frequency spectrum band. The device transceiver module(s) 1330 may be configured to communicate bi-directionally, via the device antenna(s) 1340, with one or more of the base stations 105, 205, 205-*a*, and/or 605 described with reference to FIGS. 1, 2, and/or 6. While the wireless device 1315 may include a single device antenna, there may be examples in which the wireless device 1315 may include multiple device antennas 1340.

The device state module 1350 may be used, for example, to manage transitions of the wireless device 1315 between a radio resource control (RRC) idle state and an RRC connected state, and may be in communication with other components of the wireless device 1315, directly or indirectly, over the one or more buses 1335. The device state module 1350, or portions of it, may include a processor, and/or some or all of the functions of the device state module 1350 may be performed by the device processor module 1310 and/or in connection with the device processor module 1310.

The device wireless communication management module 1360 may be configured to perform and/or control some or all of the features and/or functions described with reference to FIGS. 1, 2, 3, 4, 5, 6, 7, 8, 9, 10, 11, and/or 12 related to wireless communication over the first radio frequency spectrum band and/or the second radio frequency spectrum band. For example, the device wireless communication management module 1360 may be configured to support a supplemental downlink mode, a carrier aggregation mode, and/or a standalone mode using the first radio frequency spectrum band and/or the second radio frequency spectrum band. The device wireless communication management module 1360 may include a device LTE/LTE-A module for licensed radio frequency spectrum band 1365, configured to handle LTE/LTE-A communications in the first radio frequency spectrum band, and a device LTE/LTE-A module for unlicensed radio frequency spectrum band 1370, configured to handle LTE/LTE-A communications in the second radio frequency spectrum band. The device wireless communication management module 1360, or portions of it, may include a processor, and/or some or all of the functions of the device wireless communication management module 1360 may be performed by the device processor module 1310 and/or in connection with the device processor module 1310. In some examples, the device wireless communication management module 1360 may be an example of the wireless communication management module 1020 and/or 1120 described with reference to FIGS. 10 and/or 11.

Figure 14:
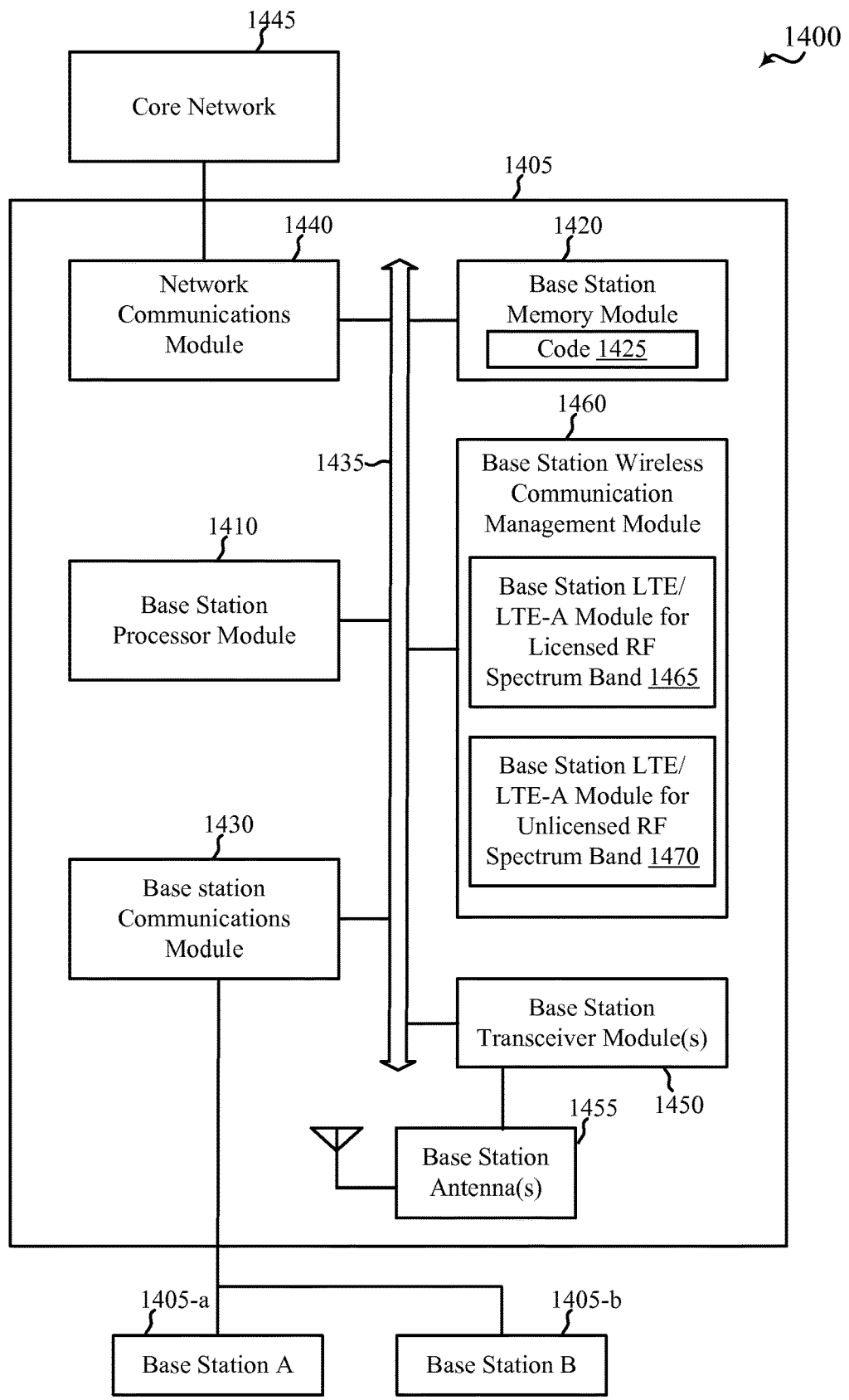
FIG. 14 shows a block diagram of a base station (e.g., a base station forming part or all of an eNB) for use in wireless communication, in accordance with various aspects of the present disclosure.

FIG. 14 shows a block diagram 1400 of a base station 1405 (e.g., a base station forming part or all of an eNB) for use in wireless communication, in accordance with various aspects of the present disclosure. In some examples, the base station 1405 may be an example of one or more aspects of the base station 105, 205, 205-*a*, and/or 605 described with reference to FIGS. 1, 2, and/or 6. The base station 1405 may be configured to implement or facilitate at least some of the base station features and functions described with reference to FIGS. 1, 2, 3, 4, 5, 6, 7, 8, and/or 9.

The base station 1405 may include a base station processor module 1410, a base station memory module 1420, at least one base station transceiver module (represented by base station transceiver module(s) 1450), at least one base station antenna (represented by base station antenna(s) 1455), and/or a base station wireless communication management module 1460. The base station 1405 may also include one or more of a base station communications module 1430 and/or a network communications module 1440. Each of these components may be in communication with each other, directly or indirectly, over one or more buses 1435.

The base station memory module 1420 may include RAM and/or ROM. The base station memory module 1420 may store computer-readable, computer-executable code 1425 containing instructions that are configured to, when executed, cause the base station processor module 1410 to perform various functions described herein related to wireless communication, including, for example, the scheduling of uplink transmissions. Alternatively, the code 1425 may not be directly executable by the base station processor module 1410 but be configured to cause the base station 1405 (e.g., when compiled and executed) to perform various of the functions described herein.

The base station processor module 1410 may include an intelligent hardware device, e.g., a central processing unit (CPU), a microcontroller, an ASIC, etc. The base station processor module 1410 may process information received through the base station transceiver module(s) 1450, the base station communications module 1430, and/or the network communications module 1440. The base station processor module 1410 may also process information to be sent to the transceiver module(s) 1450 for transmission through the antenna(s) 1455, to the base station communications module 1430, for transmission to one or more other base stations 1405-a and 1405-b, and/or to the network communications module 1440 for transmission to a core network 1445, which may be an example of one or more aspects of the core network 130 described with reference to FIG. 1. The base station processor module 1410 may handle, alone or in connection with the base station wireless communication management module 1460, various aspects of communicating over (or managing communications over) a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band for which apparatuses may need to contend for access because the radio frequency spectrum band is available for unlicensed use, such as Wi-Fi use).

The base station transceiver module(s) 1450 may include a modem configured to modulate packets and provide the modulated packets to the base station antenna(s) 1455 for transmission, and to demodulate packets received from the base station antenna(s) 1455. The base station transceiver module(s) 1450 may, in some examples, be implemented as one or more base station transmitter modules and one or more separate base station receiver modules. The base station transceiver module(s) 1450 may support communications in the first radio frequency spectrum band and/or the second radio frequency spectrum band. The base station transceiver module(s) 1450 may be configured to communicate bi-directionally, via the antenna(s) 1455, with one or more wireless devices or apparatuses, such as one or more of the wireless devices 115, 215, 215-a, 215-b, 215-c, 615, and/or 1315 described with reference to FIGS. 1, 2, 6, and/or 13, and/or one or more of the apparatuses 1015 and/or 1115 described with reference to FIGS. 10 and/or 11. The base station 1405 may, for example, include multiple base station antennas 1455 (e.g., an antenna array). The base station 1405 may communicate with the core network 1445 through the network communications module 1440. The base station 1405 may also communicate with other base stations, such as the base stations 1405-a and 1405-b, using the base station communications module 1430.

The base station wireless communication management module 1460 may be configured to perform and/or control some or all of the features and/or functions described with reference to FIGS. 1, 2, 3, 4, 5, 6, 7, 8, and/or 9 related to wireless communication over the first radio frequency spectrum band and/or the second radio frequency spectrum band. For example, the base station wireless communication management module 1460 may be configured to support a supplemental downlink mode, a carrier aggregation mode, and/or a standalone mode using the first radio frequency spectrum band and/or the second radio frequency spectrum band. The base station wireless communication management module 1460 may include a base station LTE/LTE-A module for licensed radio frequency spectrum band 1465, configured to handle LTE/LTE-A communications in the first radio frequency spectrum band, and/or a base station LTE/LTE-A module for unlicensed radio frequency spectrum band 1470, configured to handle LTE/LTE-A communications in the second radio frequency spectrum band. The base station wireless communication management module 1460, or portions of it, may include a processor, and/or some or all of the functions of the base station wireless communication management module 1460 may be performed by the base station processor module 1410 and/or in connection with the base station processor module 1410.

Figure 15:
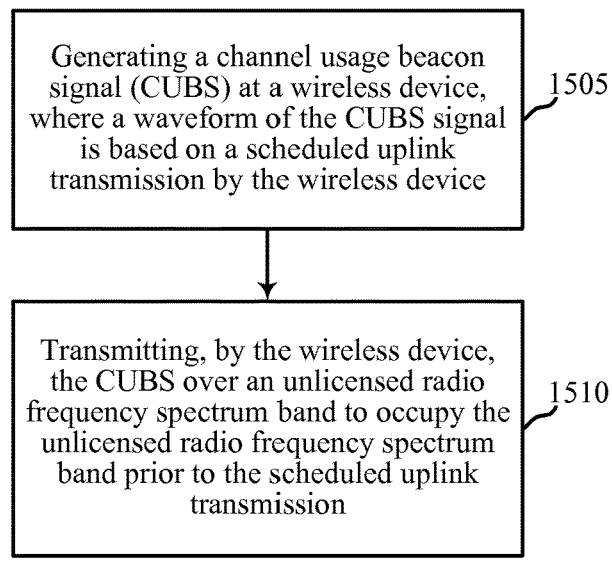
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the wireless devices 115, 215, 215-a, 215-b, 215-c, 615, and/or 1315 described with reference to FIGS. 1, 2, 6, and/or 13, and/or aspects of one or more of the apparatuses 1015 and/or 1115 described with reference to FIGS. 10 and/or 11. In some examples a wireless device may execute one or more sets of codes to control the functional elements of the wireless device to perform the functions described below.

At block 1505, the method 1500 may include generating a CUBS at a wireless device. A waveform of the CUBS may be based at least in part on a scheduled uplink transmission by the wireless device. In some examples, the scheduled uplink transmission may include a PUSCH transmission, a PUCCH transmission, and/or an SRS transmission. In some examples, the scheduled uplink transmission may include the SRS transmission multiplexed with at least one of the PUSCH transmission or the PUCCH transmission. The operation(s) at block 1505 may be performed using the wireless communication management module 1020, 1120, and/or 1360 described with reference to FIGS. 10, 11, and/or 13, and/or the CUBS generation module 1035, 1135, and/or 1235 described with reference to FIGS. 10, 11, and/or 12.

In some examples, the waveform of the CUBS generated at block 1505 may also or alternatively be generated based at least in part on an identity of the wireless device and/or an identity of a transmission period in which the scheduled uplink transmission is initially scheduled. In some examples, the transmission period in which the scheduled uplink transmission is initially scheduled may be an LBT frame, a base station synchronization frame, or a subframe, and the identity of the transmission period in which the scheduled uplink transmission is initially scheduled may be a current or previous LBT frame, base station synchronization frame, or subframe. The identified transmission period may be a previous transmission period when, for example, the wireless device is unable to successfully contend for access to an unlicensed radio frequency spectrum band for the transmission period in which the scheduled uplink transmission is initially scheduled.

At block 1510, the method 1500 may include transmitting, by the wireless device, the CUBS over an unlicensed radio frequency spectrum band to occupy the unlicensed radio frequency spectrum band prior to the scheduled uplink transmission. In some examples, the unlicensed radio frequency spectrum band may be a radio frequency spectrum band for which devices need to contend for access because the radio frequency spectrum band is available for unlicensed use, such as Wi-Fi use. The operation(s) at block 1510 may be performed using the wireless communication management module 1020, 1120, and/or 1360 described with reference to FIGS. 10, 11, and/or 13, and/or the CUBS transmission management module 1040, 1140, and/or 1240 described with reference to FIGS. 10, 11, and/or 12.

In some examples of the method 1500, the wireless device may include a first wireless device, and the scheduled uplink transmission may include a first scheduled uplink transmission of a plurality of scheduled uplink transmissions to a base station during a transmission period. The plurality of scheduled uplink transmissions may also include a second scheduled uplink transmission by a second wireless device. In these examples, the first scheduled uplink transmission may differ from the second scheduled uplink transmission, and thus, the first CUBS may differ from a second CUBS transmitted over the unlicensed radio frequency spectrum band to occupy the unlicensed radio frequency spectrum band prior to the second scheduled uplink transmission.

In some examples of the method 1500, the scheduled uplink transmission may include a first scheduled uplink transmission, and the CUBS may include a first CUBS. In these examples, the method 1500 may further include generating a second CUBS at the wireless device. A waveform of the second CUBS may be based at least in part on a second scheduled uplink transmission by the wireless device. The method 1500 may also include transmitting, by the wireless device, the second CUBS over the unlicensed radio frequency spectrum band to occupy the unlicensed radio frequency spectrum band prior to the second scheduled uplink transmission.

Thus, the method 1500 may provide for wireless communication. It should be noted that the method 1500 is just one implementation and that the operations of the method 1500 may be rearranged or otherwise modified such that other implementations are possible.

Figure 16:
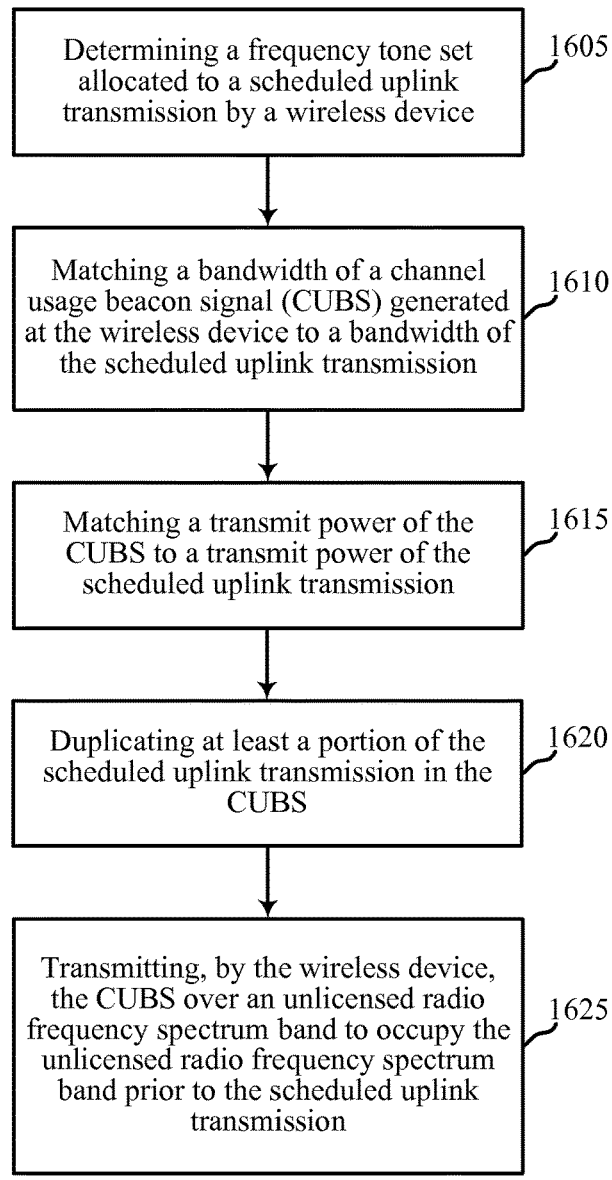
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1500 is described below with reference to aspects of one or more of the wireless devices 115, 215, 215-a, 215-b, 215-c, 615, and/or 1315 described with reference to FIGS. 1, 2, 6, and/or 13, and/or aspects of one or more of the apparatuses 1015 and/or 1115 described with reference to FIGS. 10 and/or 11. In some examples a wireless device may execute one or more sets of codes to control the functional elements of the wireless device to perform the functions described below.

At block 1605, the method 1600 may include determining a frequency tone set allocated to a scheduled uplink transmission by a wireless device. In some examples, the scheduled uplink transmission may include a PUSCH transmission, a PUCCH transmission, and/or an SRS transmission. In some examples, the scheduled uplink transmission may include the SRS transmission multiplexed with at least one of the PUSCH transmission or the PUCCH transmission. The operation(s) at block 1605 may be performed using the wireless communication management module 1020, 1120, and/or 1360 described with reference to FIGS. 10, 11, and/or 13, and/or the scheduled uplink transmission analysis module 1125 described with reference to FIG. 11.

In some examples, determining the frequency tone set allocated to the scheduled uplink transmission may include determining the frequency tone set allocated to the scheduled uplink transmission based at least in part on a static or semi-static schedule associated with the scheduled uplink transmission. In some examples, determining the frequency tone set allocated to the scheduled uplink transmission may include receiving an indication of the frequency tone set allocated to the scheduled uplink transmission from a base station.

At block 1610, block 1615, and/or block 1620, the method 1600 may include generating a CUBS at the wireless device. A waveform of the CUBS may be based at least in part on the scheduled uplink transmission by the wireless device. For example, at block 1610, the method 1600 may include matching a bandwidth of the CUBS to a bandwidth of the scheduled uplink transmission. The operation(s) at block 1610 may be performed using the wireless communication management module 1020, 1120, and/or 1360 described with reference to FIGS. 10, 11, and/or 13, the CUBS generation module 1035, 1135, and/or 1235 described with reference to FIGS. 10, 11, and/or 12, and/or the bandwidth matching module 1250 described with reference to FIG. 12.

In some examples, matching the bandwidth of the CUBS to the bandwidth of the scheduled uplink transmission may include matching a bandwidth of the CUBS to a frequency tone set allocated to the scheduled uplink transmission. In some examples, matching the bandwidth of the CUBS to the bandwidth of the scheduled uplink transmission may include matching a number of resource block interlaces associated with the CUBS to a number of resource block interlaces associated with the scheduled uplink transmission. In some examples, matching the bandwidth of the CUBS to the bandwidth of the scheduled uplink transmission may include matching a total number of resource blocks used to transmit the CUBS to a total number of resource blocks associated with the scheduled uplink transmission.

At block 1615, the method 1600 may include matching a transmit power of the CUBS to a transmit power of the scheduled uplink transmission. The operation(s) at block 1615 may be performed using the wireless communication management module 1020, 1120, and/or 1360 described with reference to FIGS. 10, 11, and/or 13, the CUBS generation module 1035, 1135, and/or 1235 described with reference to FIGS. 10, 11, and/or 12, and/or the power matching module 1255 described with reference to FIG. 12.

At block 1620, the method 1600 may include duplicating at least a portion of the scheduled uplink transmission (e.g., at least a portion of the payload of the scheduled uplink transmission) in the CUBS. The operation(s) at block 1620 may be performed using the wireless communication management module 1020, 1120, and/or 1360 described with reference to FIGS. 10, 11, and/or 13, the CUBS generation module 1035, 1135, and/or 1235 described with reference to FIGS. 10, 11, and/or 12, and/or the payload matching module 1260 described with reference to FIG. 12.

At block 1625, the method 1600 may include transmitting, by the wireless device, the CUBS over an unlicensed radio frequency spectrum band to occupy the unlicensed radio frequency spectrum band prior to the scheduled uplink transmission. In some examples, the unlicensed radio frequency spectrum band may be a radio frequency spectrum band for which devices need to contend for access because the radio frequency spectrum band is available for unlicensed use, such as Wi-Fi use. The operation(s) at block 1625 may be performed using the wireless communication management module 1020, 1120, and/or 1360 described with reference to FIGS. 10, 11, and/or 13, and/or the CUBS transmission management module 1040, 1140, and/or 1240 described with reference to FIGS. 10, 11, and/or 12.

Thus, the method 1600 may provide for wireless communication. It should be noted that the method 1600 is just one implementation and that the operations of the method 1600 may be rearranged or otherwise modified such that other implementations are possible.

Figure 17:
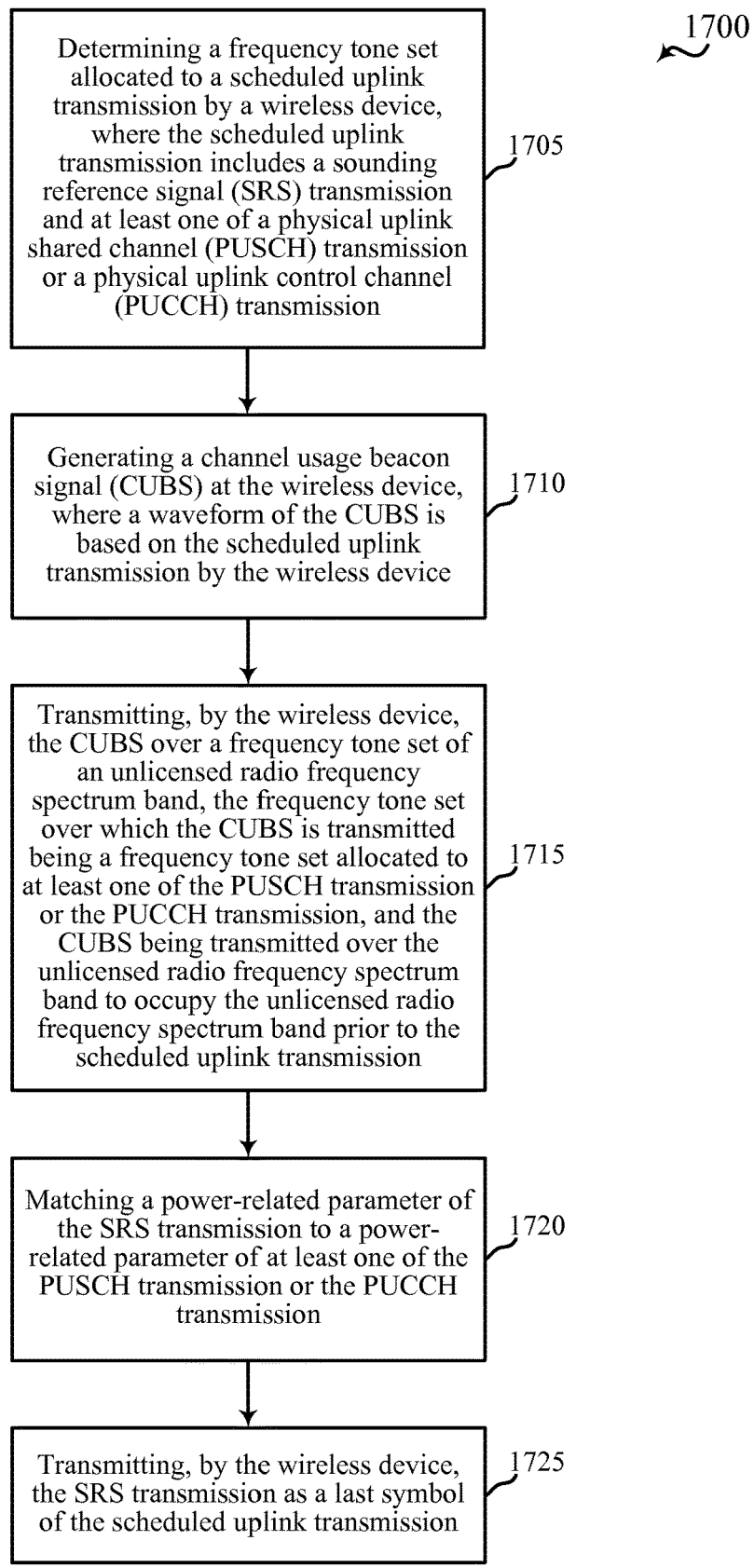
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1500 is described below with reference to aspects of one or more of the wireless devices 115, 215, 215-*a*, 215-*b*, 215-*c*, 615, and/or 1315 described with reference to FIGS. 1, 2, 6, and/or 13, and/or aspects of one or more of the apparatuses 1015 and/or 1115 described with reference to FIGS. 10 and/or 11. In some examples a wireless device may execute one or more sets of codes to control the functional elements of the wireless device to perform the functions described below.

At block 1705, the method 1700 may include determining a frequency tone set allocated to a scheduled uplink transmission by a wireless device. In some examples, the scheduled uplink transmission may include an SRS transmission and at least one of a PUSCH transmission or a PUCCH transmission. The operation(s) at block 1705 may be performed using the wireless communication management module 1020, 1120, and/or 1360 described with reference to FIGS. 10, 11, and/or 13, and/or the scheduled uplink transmission analysis module 1125 described with reference to FIG. 11.

In some examples, determining the frequency tone set allocated to the scheduled uplink transmission may include determining the frequency tone set allocated to the scheduled uplink transmission based at least in part on a static or semi-static schedule associated with the scheduled uplink transmission. In some examples, determining the frequency tone set allocated to the scheduled uplink transmission may include receiving an indication of the frequency tone set allocated to the scheduled uplink transmission from a base station.

At block 1710, the method 1700 may include generating a CUBS at the wireless device. A waveform of the CUBS may be based at least in part on the scheduled uplink transmission by the wireless device. The operation(s) at block 1710 may be performed using the wireless communication management module 1020, 1120, and/or 1360 described with reference to FIGS. 10, 11, and/or 13, and/or the CUBS generation module 1035, 1135, and/or 1235 described with reference to FIGS. 10, 11, and/or 12.

At block 1715, the method 1700 may include transmitting, by the wireless device, the CUBS over a frequency tone set of the unlicensed radio frequency spectrum band. The frequency tone set over which the CUBS is transmitted may be a frequency tone set allocated to at least one of the PUSCH transmission or the PUCCH transmission. The CUBS may be transmitted over the unlicensed radio frequency spectrum band to occupy the unlicensed radio frequency spectrum band prior to the scheduled uplink transmission. In some examples, the unlicensed radio frequency spectrum band may be a radio frequency spectrum band for which devices need to contend for access because the radio frequency spectrum band is available for unlicensed use, such as Wi-Fi use. The operation(s) at block 1715 may be performed using the wireless communication management module 1020, 1120, and/or 1360 described with reference to FIGS. 10, 11, and/or 13, and/or the CUBS transmission management module 1040, 1140, and/or 1240 described with reference to FIGS. 10, 11, and/or 12.

At block 1720, the method 1700 may include matching a power-related parameter of the SRS transmission to a power-related parameter of at least one of the PUSCH transmission or the PUCCH transmission. The operation(s) at block 1720 may be performed using the wireless communication management module 1020, 1120, and/or 1360 described with reference to FIGS. 10, 11, and/or 13, and/or the SRS management module 1145 described with reference to FIG. 11.

In some examples, matching a power-related parameter of the SRS transmission to a power-related parameter of at least one of the PUSCH transmission or the PUCCH transmission may include matching a total transmit power of the SRS transmission to a total transmit power of the at least one of the PUSCH transmission or the PUCCH transmission. In some examples, matching a power-related parameter of the SRS transmission to a power-related parameter of at least one of the PUSCH transmission or the PUCCH transmission may include matching a power spectral density of the SRS transmission to a power spectral density of the at least one of the PUSCH transmission or the PUCCH transmission.

At block 1725, the method 1700 may include transmitting the SRS transmission as a last symbol of the scheduled uplink transmission. The operation(s) at block 1725 may be performed using the wireless communication management module 1020, 1120, and/or 1360 described with reference to FIGS. 10, 11, and/or 13, and/or the SRS management module 1145 described with reference to FIG. 11.

Thus, the method 1700 may provide for wireless communication. It should be noted that the method 1700 is just one implementation and that the operations of the method 1700 may be rearranged or otherwise modified such that other implementations are possible.

In some examples, aspects of one or more of the methods 1500, 1600, and/or 1700 described with reference to FIGS. 15, 16, and/or 17 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
generating a channel usage beacon signal (CUBS) at a wireless device, wherein a waveform of the CUBS is based at least in part on a resource block interlace allocated to a scheduled uplink transmission from the wireless device, the resource block interlace comprising a plurality of resource blocks evenly distributed across a first frequency range of an unlicensed radio frequency spectrum band, wherein the scheduled uplink transmission comprises a multiplexed transmission including a sounding reference signal (SRS) transmission, wherein the CUBS is generated based at least in part on matching a total number of resource blocks used to transmit the CUBS to a total number of resource blocks allocated to the scheduled uplink transmission, wherein matching the total number of resource blocks comprises matching both a quantity of frequency resources and a quantity of time resources between the CUBS and the scheduled uplink transmission, and wherein a transmit power of the CUBS is matched to a transmit power of the SRS transmission; and
transmitting, by the wireless device, the CUBS over the unlicensed radio frequency spectrum band to occupy at least a portion of the unlicensed radio frequency spectrum band prior to the scheduled uplink transmission.

2. The method of claim 1, wherein generating the CUBS further comprises:
matching a transmit power of the CUBS to a transmit power of the scheduled uplink transmission.

3. The method of claim 1, further comprising:
determining the resource block interlace allocated to the scheduled uplink transmission based at least in part on a static or semi-static schedule associated with the scheduled uplink transmission.

4. The method of claim 1, wherein matching the total number of resource blocks used to transmit the CUBS to the total number of resource blocks allocated to the scheduled uplink transmission comprises:
matching a resource block interlace of the CUBS to the resource block interlace allocated to the scheduled uplink transmission.

5. The method of claim 1, wherein the scheduled uplink transmission comprises one or more transmissions selected from a group consisting of:
a physical uplink shared channel (PUSCH) transmission and a physical uplink control channel (PUCCH) transmission.

6. The method of claim 5, wherein the scheduled uplink transmission comprises both the SRS transmission and at least one of the PUSCH transmission or the PUCCH transmission, the method further comprising:
- matching a resource block interlace of the CUBS to the resource block interlace allocated to the at least one of the PUSCH transmission or the PUCCH transmission; and
- transmitting the SRS transmission as a last symbol of the scheduled uplink transmission.

7. The method of claim 6, further comprising at least one of:
- matching a total transmit power of the SRS transmission to a total transmit power of the at least one of the PUSCH transmission or the PUCCH transmission; or
- matching a power spectral density of the SRS transmission to a power spectral density of the at least one of the PUSCH transmission or the PUCCH transmission.

8. The method of claim 5, wherein the CUBS is transmitted over a resource block interlace allocated to the multiplexed transmission.

9. The method of claim 1, wherein the waveform of the CUBS is further generated based at least in part on an identity of the wireless device.

10. The method of claim 1, wherein the wireless device comprises a first wireless device; wherein the scheduled uplink transmission comprises a first scheduled uplink transmission of a plurality of scheduled uplink transmissions to a base station during a transmission period; wherein the plurality of scheduled uplink transmissions comprises a second scheduled uplink transmission by a second wireless device; wherein the first scheduled uplink transmission differs from the second scheduled uplink transmission.

11. The method of claim 1, wherein the scheduled uplink transmission comprises a first scheduled uplink transmission and wherein the CUBS comprises a first CUBS, the method further comprising:
- generating a second CUBS at the wireless device, wherein a waveform of the second CUBS is based at least in part on a second resource block interlace allocated to a second scheduled uplink transmission from the wireless device, the second resource block interlace comprising a second plurality of resource blocks evenly distributed across a second frequency range of the unlicensed radio frequency spectrum; and
- transmitting, by the wireless device, the second CUBS over the unlicensed radio frequency spectrum band to occupy at least a second portion of the unlicensed radio frequency spectrum band prior to the second scheduled uplink transmission.

12. The method of claim 1, wherein the scheduled uplink transmission is scheduled for a transmission period selected from a group consisting of a Listen Before Talk (LBT) frame, a base station synchronization frame, and a subframe.

13. The method of claim 1, wherein the waveform of the CUBS is further generated based at least in part on an identity of a transmission period in which the scheduled uplink transmission is initially scheduled.

14. An apparatus for wireless communication, comprising:
- means for generating a channel usage beacon signal (CUBS) at a wireless device, wherein a waveform of the CUBS is based at least in part on a resource block interlace allocated to a scheduled uplink transmission from the apparatus, the resource block interlace comprising a plurality of resource blocks evenly distributed across a first frequency range of an unlicensed radio frequency spectrum band, wherein the scheduled uplink transmission comprises a multiplexed transmission including a sounding reference signal (SRS) transmission, wherein the CUBS is generated based at least in part on matching a total number of resource blocks used to transmit the CUBS to a total number of resource blocks allocated to the scheduled uplink transmission, wherein matching the total number of resource blocks comprises matching both a quantity of frequency resources and a quantity of time resources between the CUBS and the scheduled uplink transmission, and wherein a transmit power of the CUBS is matched to a transmit power of the SRS transmission; and
- means for transmitting the CUBS over the unlicensed radio frequency spectrum band to occupy at least a portion of the unlicensed radio frequency spectrum band prior to the scheduled uplink transmission.

15. The apparatus of claim 14, wherein the means for generating the CUBS further comprises:
- means for matching a transmit power of the CUBS to a transmit power of the scheduled uplink transmission.

16. The apparatus of claim 14, further comprising:
- means for determining the resource block interlace allocated to the scheduled uplink transmission based at least in part on a static or semi-static schedule associated with the scheduled uplink transmission.

17. The apparatus of claim 14, wherein the means for matching the total number of resource blocks used to transmit the CUBS to the total number of resource blocks allocated to the scheduled uplink transmission comprises:
- means for matching a resource block interlace of the CUBS to the resource block interlace allocated to the scheduled uplink transmission.

18. The apparatus of claim 14, wherein the scheduled uplink transmission comprises one or more transmissions selected from a group consisting of:
- a physical uplink shared channel (PUSCH) transmission and a physical uplink control channel (PUCCH) transmission.

19. The apparatus of claim 14, wherein the waveform of the CUBS is further generated based at least in part on an identity of the apparatus.

20. The apparatus of claim 14, wherein the apparatus comprises a first wireless device; wherein the scheduled uplink transmission comprises a first scheduled uplink transmission of a plurality of scheduled uplink transmissions to a base station during a transmission period; wherein the plurality of scheduled uplink transmissions comprises a second scheduled uplink transmission by a second wireless device; and wherein the first scheduled uplink transmission differs from the second scheduled uplink transmission.

21. The apparatus of claim 14, wherein the scheduled uplink transmission comprises a first scheduled uplink transmission and wherein the CUBS comprises a first CUBS, the apparatus further comprising:
- means for generating a second CUBS, wherein a waveform of the second CUBS is based at least in part on a second resource block interlace allocated to a second scheduled uplink transmission from the apparatus, the second resource block interlace comprising a second plurality of resource blocks evenly distributed across a second frequency range of the unlicensed radio frequency spectrum; and
- means for transmitting the second CUBS over the unlicensed radio frequency spectrum band to occupy at least a second portion of the unlicensed radio frequency spectrum band prior to the second scheduled uplink transmission.

22. An apparatus for wireless communication, comprising:
- a processor; and
- memory coupled to the processor, wherein the processor is configured to:
  - generate a channel usage beacon signal (CUBS) at a wireless device, wherein a waveform of the CUBS is based at least in part on a resource block interlace allocated to a scheduled uplink transmission from the wireless device, the resource block interlace comprising a plurality of resource blocks evenly distributed across a first frequency range of an unlicensed radio frequency spectrum band, wherein the scheduled uplink transmission comprises a multiplexed transmission including a sounding reference signal (SRS) transmission, wherein the CUBS is generated based at least in part on matching a total number of resource blocks used to transmit the CUBS to a total number of resource blocks allocated to the scheduled uplink transmission, wherein matching the total number of resource blocks comprises matching both a quantity of frequency resources and a quantity of time resources between the CUBS and the scheduled uplink transmission, and wherein a transmit power of the CUBS is matched to a transmit power of the SRS transmission; and
  - transmit the CUBS over the unlicensed radio frequency spectrum band to occupy at least a portion of the unlicensed radio frequency spectrum band prior to the scheduled uplink transmission.

23. The apparatus of claim 22, wherein the processor configured to generate the CUBS is further configured to:
- match a transmit power of the CUBS to a transmit power of the scheduled uplink transmission.

24. The apparatus of claim 22, wherein the scheduled uplink transmission comprises one or more transmissions selected from a group consisting of: a physical uplink shared channel (PUSCH) transmission and a physical uplink control channel (PUCCH) transmission.

25. The apparatus of claim 22, wherein the waveform of the CUBS is further generated based at least in part on an identity of the apparatus.

26. A non-transitory computer-readable medium storing code for wireless communication, the code comprising instructions executable by a processor to:
- generate a channel usage beacon signal (CUBS) at a wireless device, wherein a waveform of the CUBS is based at least in part on a resource block interlace allocated to a scheduled uplink transmission from the wireless device, the resource block interlace comprising a plurality of resource blocks evenly distributed across a first frequency range of an unlicensed radio frequency spectrum band, wherein the scheduled uplink transmission comprises a multiplexed transmission including a sounding reference signal (SRS) transmission, wherein the CUBS is generated based at least in part on matching a total number of resource blocks used to transmit the CUBS to a total number of resource blocks allocated to the scheduled uplink transmission, wherein matching the total number of resource blocks comprises matching both a quantity of frequency resources and a quantity of time resources between the CUBS and the scheduled uplink transmission, and wherein a transmit power of the CUBS is matched to a transmit power of the SRS transmission; and
- transmit, by the wireless device, the CUBS over the unlicensed radio frequency spectrum band to occupy at least a portion of the unlicensed radio frequency spectrum band prior to the scheduled uplink transmission.

27. The method of claim 1, wherein the resource block interlace further comprises a second plurality of resource blocks evenly distributed across the first frequency range, the second plurality of resource blocks disjoint from the plurality of resource blocks.

* * * * *